(12) United States Patent
Kriesel

(10) Patent No.: US 7,039,220 B2
(45) Date of Patent: May 2, 2006

(54) METHODS AND APPARATUS FOR THE DIMENSIONAL MEASUREMENT OF LIVESTOCK USING A SINGLE CAMERA

(75) Inventor: Marshall S. Kriesel, St. Paul, MN (US)

(73) Assignee: C-Scan, L.L.P., Minneapolis, MN (US)

( * ) Notice: Subject to any disclaimer, the term of this patent is extended or adjusted under 35 U.S.C. 154(b) by 774 days.

(21) Appl. No.: 10/219,618

(22) Filed: Aug. 14, 2002

(65) Prior Publication Data

US 2004/0032974 A1 Feb. 19, 2004

(51) Int. Cl.
*G06K 9/00* (2006.01)

(52) U.S. Cl. ..................... 382/110; 452/157
(58) Field of Classification Search ................ 382/100, 382/110, 312, 318; 452/157; 119/518, 174, 119/840; 356/603; 600/587
See application file for complete search history.

(56) References Cited

U.S. PATENT DOCUMENTS

| | | | |
|---|---|---|---|
| 4,280,448 A | 7/1981 | Ostermann | |
| 4,288,856 A | 9/1981 | Linseth | |
| 4,617,876 A | 10/1986 | Hayes | |
| 4,745,472 A * | 5/1988 | Hayes | 348/141 |
| 4,939,574 A | 7/1990 | Petersen et al. | |
| 5,205,779 A | 4/1993 | O'Brien | |
| 5,412,420 A * | 5/1995 | Ellis | 348/135 |
| 5,458,418 A | 10/1995 | Jones et al. | |
| 5,474,085 A * | 12/1995 | Hurnik et al. | 600/587 |
| 5,483,441 A * | 1/1996 | Scofield | 700/90 |
| 5,576,949 A * | 11/1996 | Scofield et al. | 702/179 |
| 5,979,359 A * | 11/1999 | Hansson | 119/14.08 |
| 6,032,084 A | 2/2000 | Anderson et al. | |
| 6,123,451 A | 9/2000 | Schaefer et al. | |
| 6,148,249 A * | 11/2000 | Newman | 700/225 |
| 6,198,834 B1 | 3/2001 | Belk et al. | |
| 6,318,289 B1 | 11/2001 | Pratt | |
| 6,377,353 B1 * | 4/2002 | Ellis | 356/603 |
| 6,549,289 B1 * | 4/2003 | Ellis | 356/603 |
| 6,625,302 B1 * | 9/2003 | Kalscheur et al. | 382/110 |
| 6,685,913 B1 * | 2/2004 | Thakur | 424/1.65 |
| 6,805,075 B1 * | 10/2004 | Pratt | 119/51.02 |
| 6,831,603 B1 * | 12/2004 | Menache | 342/463 |
| 2004/0022731 A1* | 2/2004 | Bogdanov et al. | 424/9.6 |
| 2004/0023612 A1* | 2/2004 | Kriesel | 452/157 |
| 2004/0101842 A1* | 5/2004 | Haley et al. | 435/6 |
| 2005/0011466 A1* | 1/2005 | Doyle | 119/518 |
| 2005/0136819 A1* | 6/2005 | Kriesel | 452/157 |

* cited by examiner

*Primary Examiner*—Barry Choobin
(74) *Attorney, Agent, or Firm*—James E. Brunton, Esq.

(57) ABSTRACT

A method and apparatus for measuring target animals, including livestock animals and full carcasses, and more specifically livestock animals such as cattle and hogs using a single camera system. More particularly, the method of the invention is directed toward obtaining key measurements of the target animal, such as animal weight, animal hip height and animal hip width.

29 Claims, 26 Drawing Sheets a) CAMERA VIEW b) LASER OF STRUCTURED LIGHT VISIBLE THROUGH A BANDPASS FILTER.

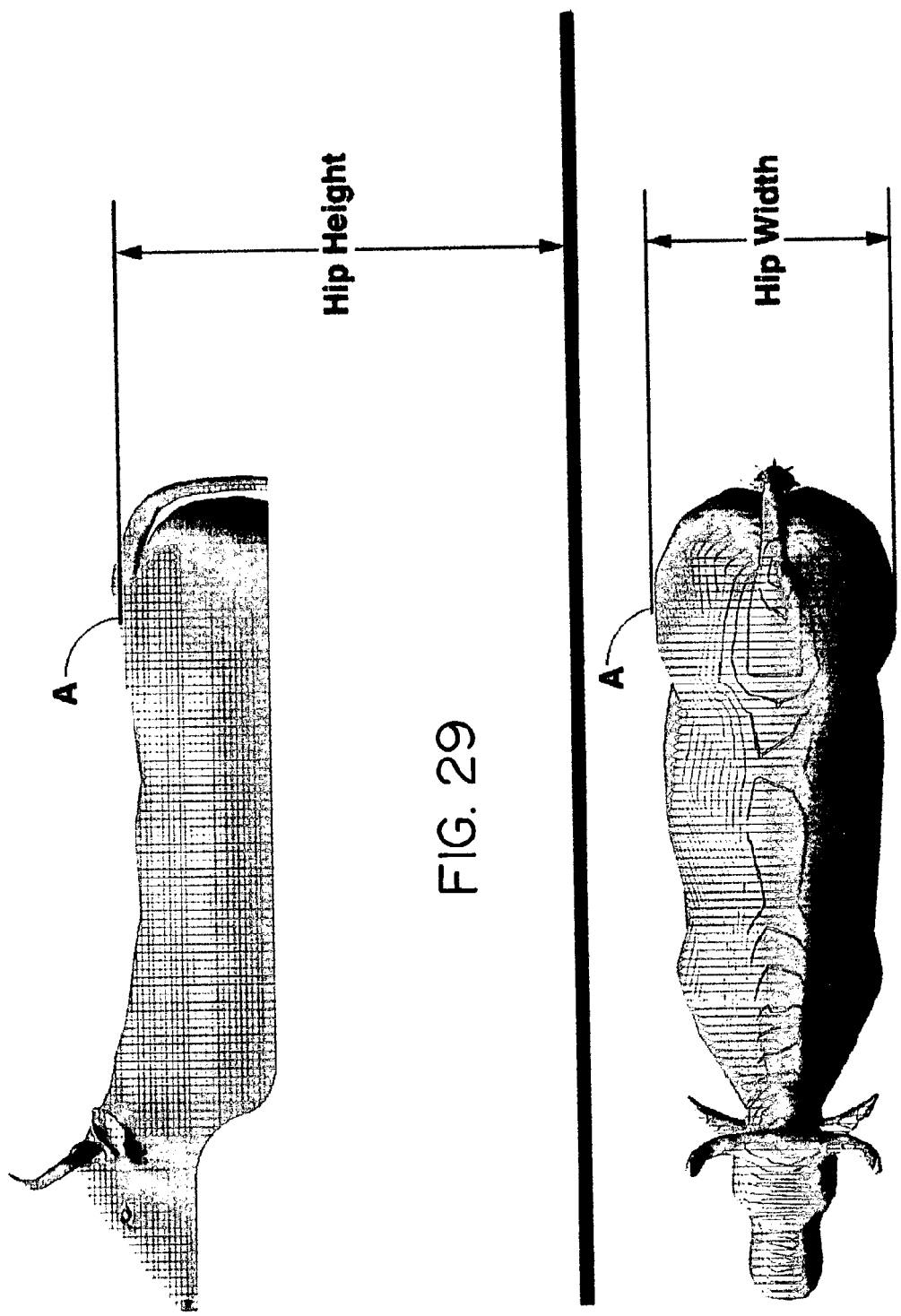

METHODS AND APPARATUS FOR THE DIMENSIONAL MEASUREMENT OF LIVESTOCK USING A SINGLE CAMERA

BACKGROUND OF THE INVENTION

1. Field of the Invention

The present invention relates generally to methods and apparatus for measuring domestic livestock with a single camera. More specifically, the invention applies selected features of advanced machine vision technology to the noninvasive and remote evaluation and quantification of livestock dimensions that are of value during breeding selections, feedlot evaluations, meat packing transactions and carcass evaluations.

2. Discussion of the Prior Art

Throughout history there has been the desire to measure domestic livestock. Whether such measurements included height, weight, width, length or strength, the measurement need was present. In the recent past weight alone was often used as an indicator of size and value. As consumer demand for leaner meats with lower fat content increases, the need grows to refine animal measurement techniques as well. The current industry trend is toward the consolidation of small operations into larger, more efficient operations. This trend requires not only accurate measurements, but automation and rapid data acquisition as well. The background of the present invention includes developments in the fields of animal measurements.

1.1. Livestock Measurements

According to USDA statistics, U.S. commercial cattle slaughter totaled 35.4 million head in 2001 with commercial hog slaughter at 98.0 million head for the same year. At each stage of meat production there is a need to measure the dimensions of the animals.

Breeding Evaluations.

In general, breeders of both cattle and hog populations are attempting to efficiently produce animals with a higher percentage of lean meat and a lower percentage of fat. However, in order to evaluate breeding efficacy, it is essential for feedlots and packing facilities to accurately measure and track live physical dimensions, growth and performance data, which in turn are matched these with end product carcass information. Without accurate and automated measurements and data collection for the individual animal, such tracking is not possible.

Feedlot Evaluations.

Ideally, the physical and growth characteristics of each animal should be known at each stage of its stay in the feedlot. This enables the optimum growth efficiency regarding carcass grading targets and market conditions. In order for this optimum management to be implemented, the physical dimensions of each animal must be accurately measured regularly during the animal's stay at the feed lot. Since North American feedlots may house ten thousand to one hundred thousand animals, it is essential that the aforementioned, repeated measurements be acquired accurately and rapidly as part of an automated tracking system.

Live Animal, Slaughter Plant Evaluations.

According to USDA statistics for 2001, the top 15 cattle slaughter plants account for 57 percent of the total production. Similarly, those statistics for the top 12 hogs slaughter facilities account for 53 percent of the total. For each of the leading plants an average of these numbers yields a weekly slaughter of 25,961 and 83,237 head for cattle and hogs, respectively. With production at these levels the measurements of live animals upon delivery requires not only accuracy, but also automation and rapid data acquisition.

Carcass Evaluations.

The same efficiency needs that pressure slaughter plants continue into the meat packaging stages. The accurate measurement and evaluation of carcasses is critical as feedback to breeders and feedlot operators to evaluate changes.

1.2. Livestock Technology

For the above reasons, non-contact imaging techniques are advantageous to measure animals and carcasses in order to achieve both measurement accuracy and improved acquisition speed. Much of the existing state-of-the-art for measuring animals or carcasses relies upon the acquisition of images showing silhouettes or profiles of an animal (or carcass). In any one view, this technique provides only a record of the target animal's shadow with the loss of any multi-dimensional shape within the silhouette outline.

Numerous inventors have contributed to the current state-of-the-art for the measurement of animals. Early patents in this field involved automated gates and weighing systems. One such patent is U.S. Pat. No. 4,280,488 issued to Ostermann which describes a gate and chute system for sorting and segregating animals by weight using scales as the measurement method. U.S. Pat. No. 4,288,856 issued to Linseth describes a method for separating and grouping animals from a feedlot herd according to weight gain characteristics also using scale measurements. U.S. Pat. No. 4,617,876 issued to Hayes describes an animal identification and control system which employs an identification tag which can be read from a distance, an automated weighing system and automated gates to control the movement of the animal.

Hayes, U.S. Pat. No. 4,745,472, proposes ways to obtain side and top profiles of animals via wall grids and video images. Chute mechanisms are used to position the animal in an upright, standing position. This patent also proposes ways of making area and linear measurements from these profiles which relate to physical characteristics of the animal.

Chevelier, et al., U.S. Pat. No. 5,194,036, discloses a method and apparatus for grading carcasses of animals involving the use of video images of the carcasses. This patent describes methods for rotating the carcass so that images can be obtained at multiple angles with multiple cameras. The two-dimensional, recorded images are then compared to a library of images in an attempt to achieve automated grading of the meat Petersen, et al., U.S. Pat. No. 4,939,574, describes a method and apparatus for obtaining a dark silhouette or contour of an animal carcass, particularly that of cattle. Details are provided for a light-screening chamber into which the carcass is placed, consisting of one wall with a lighted surface opposite a wall of frosted glass onto which the carcass shadow falls. The shadow or dark silhouette is recorded and digitized via a video camera placed at a distance behind the frosted glass wall. The video image is digitized and analyzed via a computer system. Front-lit images of the carcass are also recorded and superimposed over the silhouette outline in an attempt to identify the lean (red) and fat (white) portions of the carcass image. Additional provisions are made for the use of manual probes to measure fat thickness at various locations in an attempt to improve the estimate of the fat and lean content. This invention deals primarily with the classification of carcasses regarding fat content.

O'Brien, et al., U.S. Pat. No. 5,205,799, describes a three-dimensional, stereo-scopic, imaging system used in conjunction with an X-ray system to view the exterior and interior of an animal carcass.

U.S. Pat. No. 5,412,420 issued to James S. Ellis purportedly teaches that volumetric measurements can be accurately obtained with a single 3D, LASAR™ camera in a side view using the animal's lateral symmetry. However, it is apparent that, while lateral symmetry may exist for a given animal on either side of the median or mid-sagittal plane running from head to tail, the lateral (horizontal) position of that plane cannot be accurately determined from side-view, image data. The lateral center of the animal (aligned along the spinal cord) can be found from a top (or bottom) view. In the side view, the top surface of the animal is at best, nearly parallel to the camera axis and may be completely hidden from the camera for camera elevations lower than the back height. A 2 to 8 inch error in measuring the lateral position of the symmetry plane will have a significant impact on the accuracy of any volume calculation.

Ellis, in U.S. Pat. No. 6,377,353, describes a measurement system which purportedly measures the three-dimensional linear, angular and volumetric characteristics of an animal or carcass, such as beef cattle. The capacity to obtain these useful livestock measurements relies largely upon the system's ability to accurately determine the three-dimensional surface of the target animal. This patent teaches that the three-dimensional surface is determined by first projecting light spots onto the surface of the target animal as shown in FIG. 1 of the patent. These light spots are then observed by the receiving camera located immediately adjacent to the projector as shown in FIG. 6 of the patent. According to this patent, the image obtained by the receiving camera may be analyzed to determine the dimensions of the light spots on the surface of the target animal. As described in column 3, lines 56–65, the measured diameter of a given light spot, as measured in the camera image, is proportional to the distance between the target surface and the receiving camera. A spot diameter of 1.5 inches corresponds to a distance of 6 feet, while a spot diameter of 1.75 inches corresponds to a distance of 7 feet. Variations of structured light which may include squares, vertical bars or horizontal bars behave in a manner similar to the light spots.

Jones, et al., U.S. Pat. No. 5,458,418, describes a method for detecting poor meat quality from thermal images of cattle and swine. If the thermal images reveal skin temperatures outside of the predetermined, absolute temperature ranges, 28–32 +/−2 degrees C. for cattle and 24–26+/−2 degrees C. for swine, the animal is likely to provide poor meat quality.

Hurnick, et al., U.S. Pat. No. 5,474,085, discloses a thermographic imaging system for remote sensing of various characteristics of livestock, such as weight, carcass pH, temperature and location Scofield, U.S. Pat. No. 5,483,441, describes a method for evaluating changeable configuration bodies which move through first and second scenes, corresponding to differing first and second fields of view.

Scofield et al., U.S. Pat. No. 5,576,949, is similar to U.S. Pat. No. 5,483,441 with the addition of black and white bars on the walls of the chute to provide a repetitive pattern which is detected via spectral analysis in order to help identify that part of the image that is background and not animal.

Tong, et al., U.S. Pat. No. 5,595,444, improves upon the inventions of U.S. Pat. No. 5,58,418 (Jones, Schaefer, Tong, Scott, Gariepy, and Graham) for identifying cattle and swine that are likely to provide poor meat quality. This invention acquires thermal images of the animals and identifies those that statistically fall outside of a range of normal for a given herd or group as those likely to provide poor meat quality.

In U.S. Pat. Nos. 5,673,647, 6,000,361, 6,135,055, and 6,318,289, William C. Pratt describes cattle management systems in great detail. These system include individual animal identification by electronic methods, animal measurement, automated data inputs, cattle handling and sorting components, computer systems to calculate the optimum slaughter weight and marketing date for shipment of the animal to a meat processing plant. These patents also include a description of computer calculations for correlating live animal characteristics to the measured carcass characteristics.

Tong, et al., U.S. Pat. No. 5,944,598, uses infrared thermography to detect poor meat quality in live animals. With their technique thermal images are acquired of a group of animals. A mean temperature is computed for the group and every animal in the group. Animals are rejected as having a high probability of producing poor meat quality if their individual thermal characteristics differ significantly from that of the group.

Anderson, et al., U.S. Pat. No. 6,032,084, describes a fully automated, animal feedlot management system where each feed delivery vehicle uses real-time virtual reality modeling and satellite-based, global positioning system (GPS) technology to direct various types of feedlot operations.

Schaefer et al., U.S. Pat. No. 6,123,451, discloses a process for determining a tissue composition characteristic of an animal via infrared thermographic imaging. This invention involves the acquisition of a thermal image of the animal and/or carcass, calculating statistical information from the thermal image, inputting the statistical information into a predictive model, and solving the predictive model for tissue composition characteristics such as lean body mass, carcass fat composition, and lean yield. Correlation data presented in the patent provided correlation coefficients between thermal properties and stated variables that ranged from r=0.94 ($r^2$=0.89) to r=0.72 ($r^2$=0.52).

Belk, et al., U.S. Pat. No. 6,198,834 B1, describes an image analysis system for scoring characteristics that predict the palatability and yield of a meat carcass or cut. Specifically, the illustrative embodiments included color and color variability of fat and lean tissue, extent of marbling, average number and variance of marbling flecks per unit area, average size of marbling, the variance of marbling size, average texture of marbling and lean tissue, firmness of lean tissue, density of lean tissue, and density of connective tissue Cureton, U.S. Pat. No. 6,216,053 B1, is a fully automated feedlot management system similar to U.S. Pat. No. 6,032,084. Like U.S. Pat. No. 6,032,084 this patent lacks a provision for accurately and automatically measuring the growth and performance of the animals in the feedlot that is filled by the present invention.

1.3. Thermal Imaging Technology

Historically, thermal imaging equipment was large, inconvenient and expensive. It yielded analog display information with the use of detection elements which required cooling via a supply of liquid nitrogen. Large battery packs were required for any attempt at portable operation.

Recent solid-state developments have resulted in thermal imaging cameras that are only slightly larger that a 35 mm photographic camera. They do not require cooling and easily operate at room temperature. One such thermal imaging camera is the IR SnapShot® manufactured by Infrared Solutions, Inc. This camera is based on Honeywell infrared (IR) thermoelectric thermal array detector technology. It is an imaging radiometer, an infrared camera that acquires a thermal image of a scene and can determine the temperature of any pixel within that scene. Pressing a push button on the camera causes a 120-element linear thermoelectric detector array to scan across the focal plane of a germanium IR lens in approximately 1.5 seconds. Software within the camera permits the 120×120 pixel thermal images to be stored in flash memory cards or downloaded directly to a laptop or desktop computer for processing. The calibrated thermal images may be displayed with numerous color maps on either the color LCD display of the camera or on the computer displays. Radiometric IR cameras that operate at a video rate are nearing the end of development. Such cameras promise the thermal accuracy of the still IR cameras with image acquisition at the faster video rate.

Thermal images from radiometric cameras such as those described above provide a wealth of thermal information, which can be analyzed and processed. The data is basically a matrix of temperatures in which each element corresponds to a pixel in the thermal image. It is common for IR camera manufacturers to provide software, which computes thermal histograms of the scene and user selectable area or line indicators, which then provide thermal properties of the selected area or line region of the image.

SUMMARY OF THE INVENTION

The present invention provides a single camera apparatus and methods for obtaining key livestock and full carcass measurements, especially for cattle and hogs.

It is a primary object of the present invention to obtain various measurements of target animals, including livestock animals and full carcasses, and more specifically livestock animals such as cattle and hogs using a single camera system. Important goals of the invention are to provide significantly improved accuracy over existing technology and also to increase the speed of acquiring these measurements.

Another major object of the invention is to take advantage of the fact that key measurements of the target animal, such as hip height and hip width, are directed orthogonal to each other. Accordingly, by aligning one livestock measurement direction with the camera axis, the second livestock measurement becomes orthogonal to the camera axis and is easily measured across an image acquired by the camera. In this regard, in accordance with certain methods of the invention the measurement orthogonal to the camera axis is obtained by calibration of a dimension on the recorded camera image. The measurement parallel to the camera axis is achieved via conversion to the orthogonal direction or via three-dimensional (3D) range techniques.

With the forgoing in mind, it is a key object of the invention to acquire physical dimensions of live cattle or hogs as they pass through a common chute as shown in FIG. 1. In the embodiment of the invention there shown, selected physical characteristics of a target animal are determined using a single camera mounted on specially designed structural means for defining a target area within which the target animal can be positioned. The target area has a generally centrally disposed, substantially vertical, longitudinally extending first plane and a plurality of spaced apart light sources supported by the structural means in substantial alignment with the plane for illuminating at least a portion of the target animal. Data processing means are operably associated with the single camera for processing the imaging data.

Another object of the invention is to obtain various measurements of interest by aligning one of the measurement directions with the axis of an illumination source rather than with the camera axis.

Another object of the invention is to obtain various measurements of interest using a single camera with laser or structured light triangulation. In accomplishing the method of this form of the invention, the light sources are aligned with the direction of the livestock measurement and orthogonal to the hip width measurement. The single camera is positioned behind and above the target animal with the camera axis orthogonal to the hip width dimension and the target axis differing from the light source angle by a predetermined vertical angle. With this arrangement, triangulation methods can be used to determine the hip height based upon the position of the laser stripes on the back of the target animal as viewed from the camera position and hip width can be determined by the occluded portion of a given stripe on the floor of the target area, or, alternatively by the width of the curved, stripes on the back of the target animal. The laser triangulation system may be easily calibrated by simply placing an object of known dimensions in the target region and mathematically determining the coefficient, k, for hip height and an equivalent scalar for the hip width.

Another object of the invention is to obtain the various measurements of interest using a single camera with transverse illumination. In these systems the camera is aligned in parallel with one dimensional measurement direction while the light source is aligned, either directly or upon reflection, with the other orthogonal dimension. More particularly, in one form of the method of the invention the over head camera axis is aligned in parallel with the hip height direction while the illumination source is aligned in parallel with the hip width direction. In this arrangement, an opaque, white projection screen is positioned at an angle (near 45%) to permit the overhead camera to view the shadow of the target animal cast by the side illumination. As hip height increases the shadow moves up the screen. The hip width can be measured by computing the hip width within the recorded image and converting that image width into true measurements. This calibration may be accomplished by many optical calculations known to those skilled in the art or via a simple recording of known object heights with their corresponding image sizes.

Another object of the invention is to obtain the various measurements of interest using a single camera, a fluorescent light system and an angled white screen located on one side of the target animal. With this form of the apparatus of the invention, while the original axis of the light is in parallel with the overhead camera axis, the lighting axis is redirected to the transverse or orthogonal direction by the angled white screen. The lighted area is visible from an overhead camera via a mirror located on the opposite side of the target animal. The back of the target animal blocks the light in the lower region of the mirror thus making the height visible in silhouette form and measurable from above. Specially designated lenses positioned over the light minimize diffusion of the fluorescent light source.

Another object of the invention is to obtain the various measurements of interest using a single overhead camera and dual, side illuminators. The illuminators are flash units, which alternate their flash timing such that they are not energized simultaneously. The height of the target animal may be determined by the overhead camera by observing and measuring the length of the cast shadows onto screens positioned the opposite side of the animal from the energized illuminators.

Another object of the invention is to obtain the various measurements of interest using an infrared camera which records thermal images. The target animal radiates infrared (thermal) energy in all directions. As viewed from the top, orthogonal measurements, such as hip width, are available from an image measurement. The radiated IR may be reflected from an infrared reflecting surface so that the IR camera can record a side image of the animal from the top view. Hip height is measurable from the reflected infrared image.

Another object of the invention is to obtain the various measurements of interest using a single range camera. For a range camera positioned above the animal, the hip width may be measured by identifying the sides of the target animal and computing their separation across the range image in a manner somewhat similar to a common digital camera. The dimensions aligned parallel with the camera axis, such as hip height, may be calculated via a subtraction of the range distance from the stationery height of the camera position above the ground (for the over head camera condition).

BRIEF DESCRIPTION OF THE DRAWINGS

FIG. 29 is a fragmentary side view of a portion of the target animal shown in FIG. 28.

FIG. 30 is a fragmentary top view of a portion of the target animal shown in FIG. 28.

DESCRIPTION OF THE INVENTION

Figure 1:
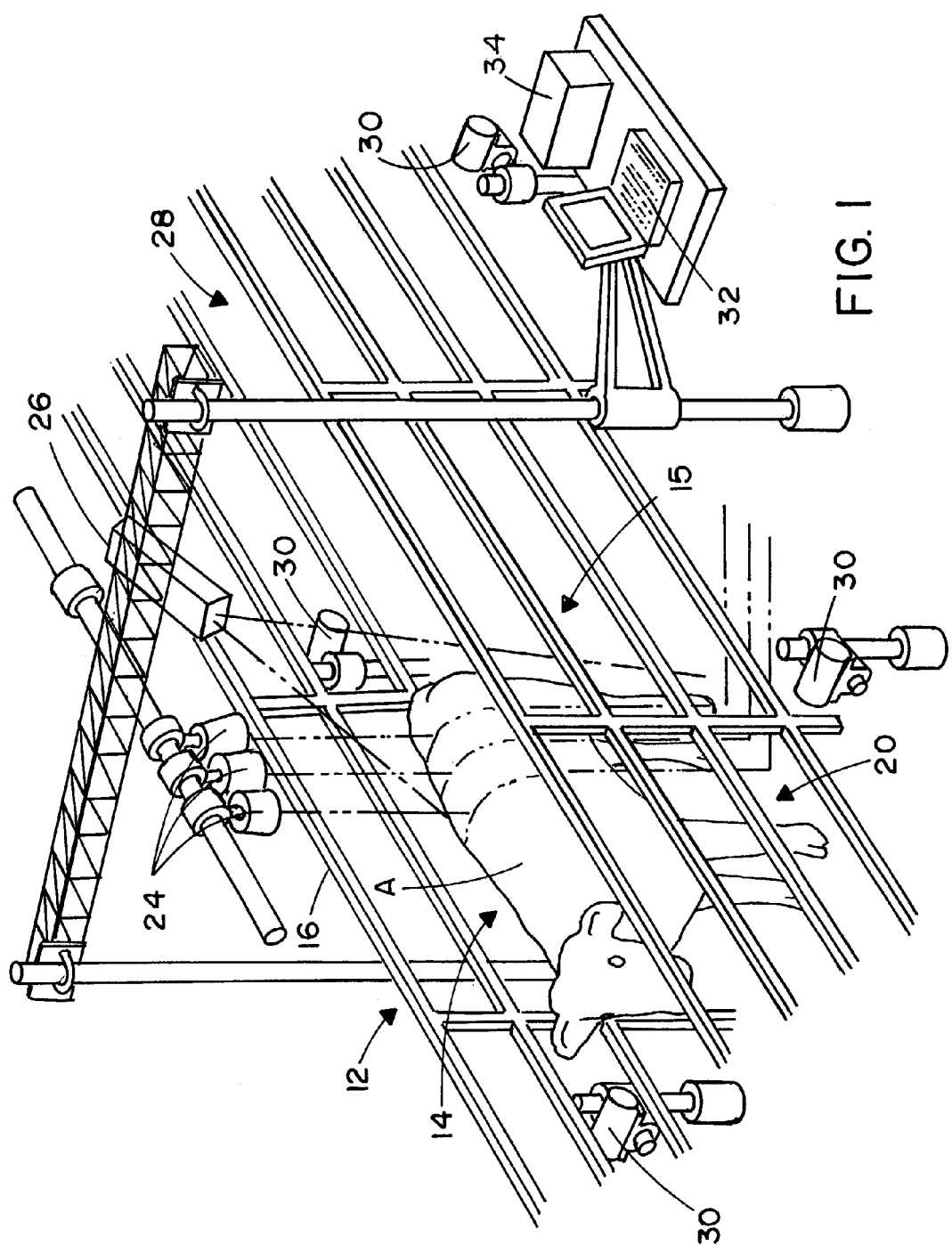
FIG. 1 is a generally perspective view of one form of the apparatus of the invention for measuring the physical characteristics of a livestock animal with a single camera via multiple-stripe, structured-light triangulation.
Figure 2:
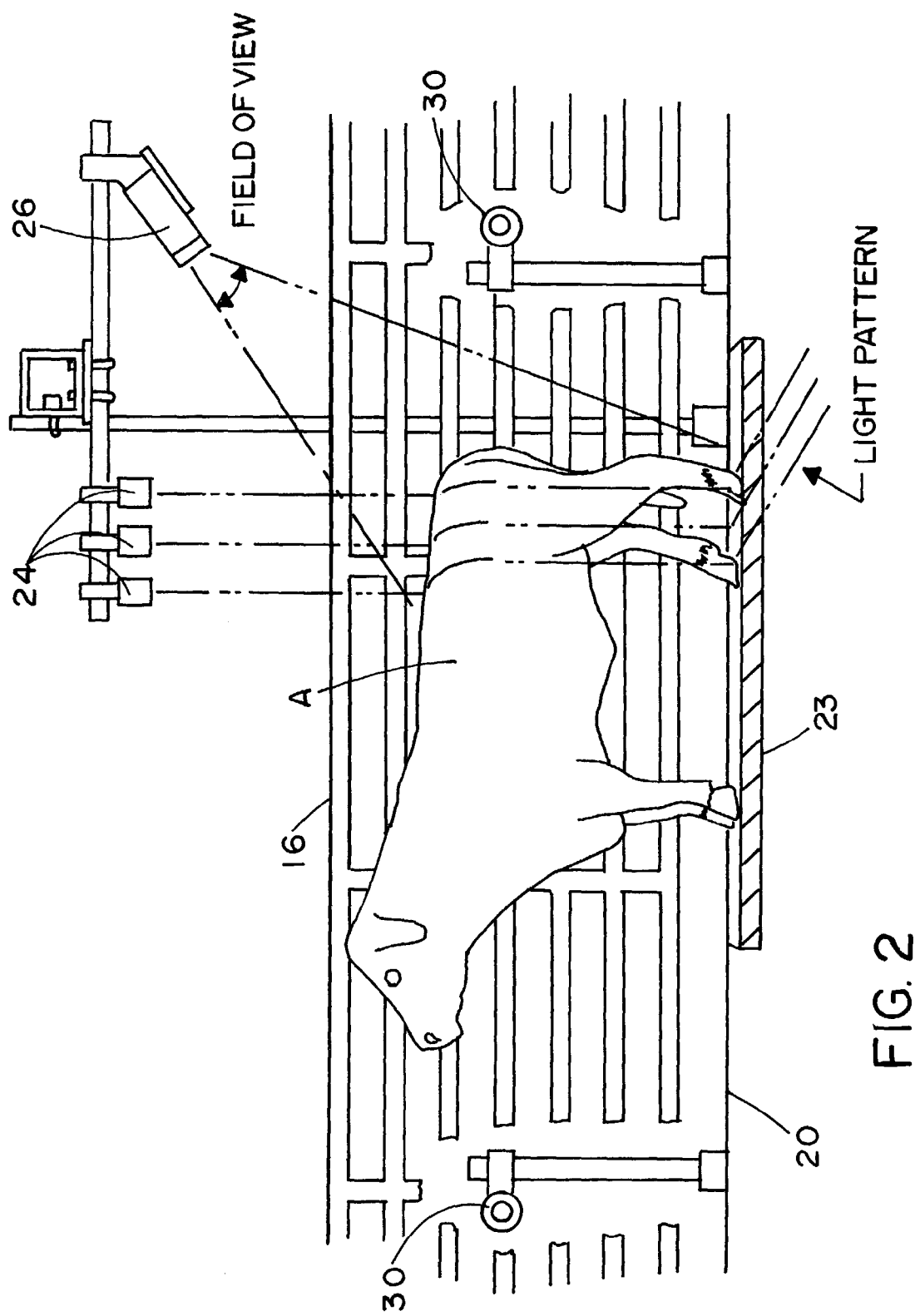
FIG. 2 is a side view illustrating the positioning of the single camera and the illuminators used to obtain the images via structured light triangulation from which the hip width and hip height of the target animal can be determined.
Figure 3:
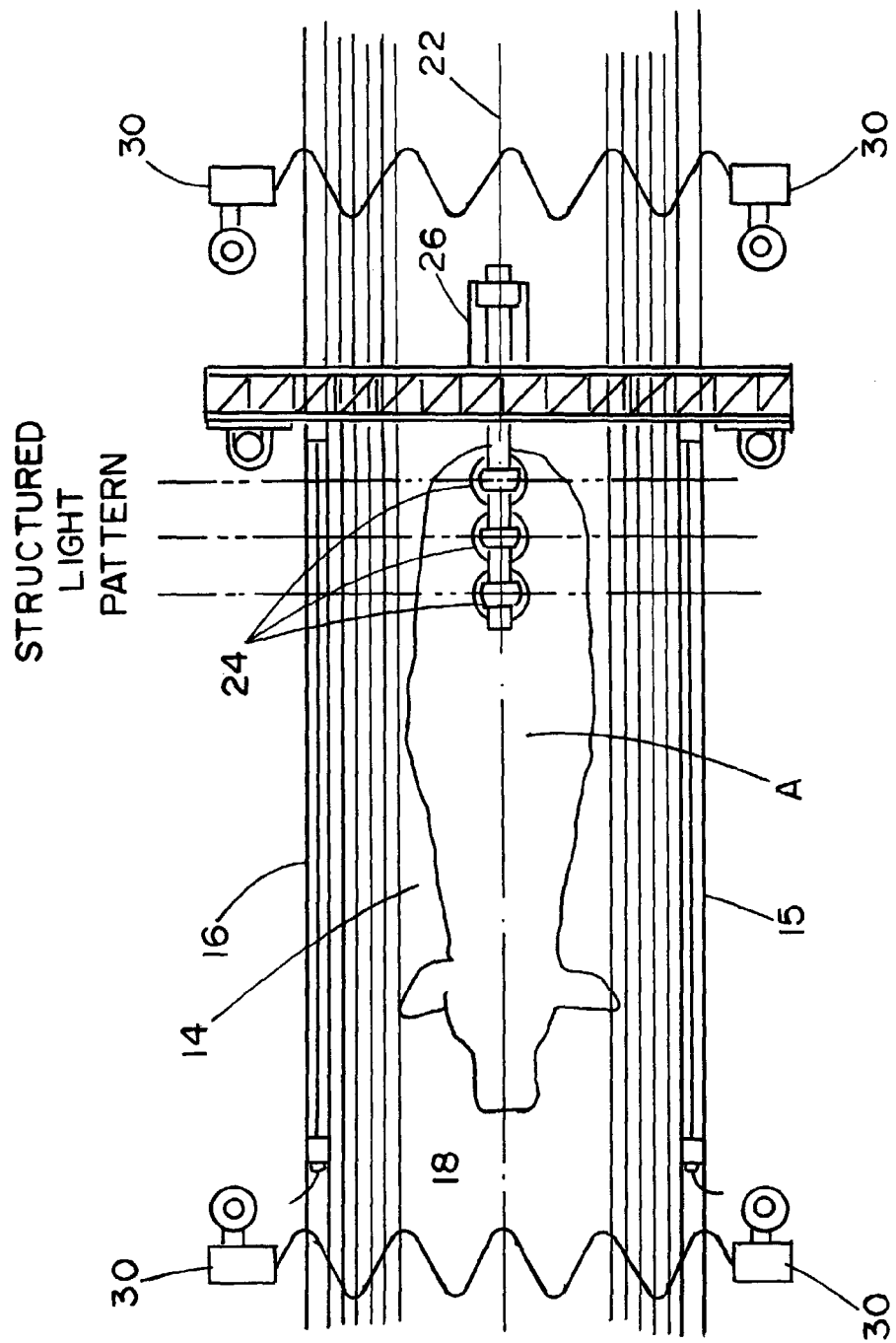
FIG. 3 is a top plan view of the apparatus of the invention shown in FIG. 1.

Referring to the drawings and particularly to FIGS. 1, 2 and 3, one form of the apparatus of the invention is their shown. The apparatus here comprises structural means for defining a target area for positioning the target animal "A" there within. This structural means here comprises a positioning structure or device, generally designated by the numeral 12. Device 12 defines an animal target area 14 that has first and second sides 15 and 16, an open top 18 and a floor 20. As best seen in FIG. 3, the target area 14 has a generally centrally disposed, substantially vertical, longitudinally extending first plane 22 (FIG. 3). Weighing means, such as a commercially available scale 23, is mounted in floor 20 and can be used to accurately determine the weight of the target animal when the animal is properly positioned within the target area 14 (FIG. 2).

Supported by the structural means are illumination means for illuminating at least a portion of the target animal "A". This illumination means here comprises a plurality of longitudinally spaced apart light sources 24. Also supported by the structural means is a single camera 26. Operably associated with camera 26 is data processing means, the character of which will presently be described, for processing imaging data acquired by camera 26.

When the target animal is properly positioned with in the target area, the midsagittal plane of the animal, that is the vertical plane running from head to tail, is in coplanar alignment with plane 22. With the animal in this position, the lateral center of the animal (aligned along the spinal cord) can be viewed from the top of the target area by the strategically located camera 26. As shown in FIG. 3, the centers of the plurality of longitudinally spaced apart light sources 24 are also aligned with plane 22.

The target animal "A" is properly positioned within the target area by means of a series of chutes, such as chute 28 (FIG. 1) that comprise a part of the positioning device 12. The chutes, in a single file manner, direct the target animals into the proper position within the target area 14 (shown also in FIG. 3). Proximity sensors 30 automatically alert the system when the animal is within the target area. These proximity sensors are readily commercially available and may take a number of different forms. For example, they may include a light transmitter and receiver which indicate proximity by breaking a visible or infrared beam. They may also include ultrasonic or infrared motion detection in a very limited region in front of each proximity detector. Numerous other means of detecting the proximity of the animal to a specific location are known to those skilled in the art.

The data processing means of the invention, which here includes a commercially available computer 32 and a control and processing unit 34, takes as input the signals from the proximity sensors that identify when the target animal is within the target zone. The control unit, in turn, outputs trigger signals to initiate image capture procedures by the camera 26. In this regard, it is to be understood that the camera, which is spaced apart from the light sources by a substantial distance, obtains imaging data of the target animal that comprises a continuous, uninterrupted and unbroken visual image of the configuration of a substantial portion of the target animal.

The data processing or control unit 34 may comprise of discrete digital circuitry, digital and analog circuitry, and microprocessor-based circuitry. The control function may also be combined with the image processing function within the processing unit.

The data processing unit 34 implements the algorithms, image processing, surface processing and weight measurements. Digital signal processing (DSP) components from such companies and Texas Instruments and Analog Devices Inc. are prime candidates for inclusion in this unit. Additionally, array processing subsystems and boards may be used to increase the processing speed if desired.

Candidates for the personal computer (PC) 32 include units from Dell Computer, Hewlett-Packard, and IBM. One such Dell computer is the Inspiron 8200 Series with the following features:

Pentium 4 Processor at 1.9 GHz;
256 Mb DDR;
15-inch color monitor;
40 GB hard drive;
Windows XP operating system;
56K telephony modem;
Soundblaster Pro/16 sound card; and
appropriate software.

Such interface features as USB ports, USB-2 ports, 10/100 Ethernet interface, RS232 serial, parallel, and 56K modem permit the PC to efficiently interface with other system components as well as peripheral devices. The processor, memory and graphics card are selected to permit display and interface with the graphical output of the DSP unit.

An almost unlimited assortment of peripheral devices are possible with the system as described herein. Some of these peripheral devices include:

printers (laser, color inkjet, color laser, or other);
local network;
Internet;
wireless links;

FIGS. 1, 2 and 3 illustrate the apparatus of the invention that is used in carrying out one form of the method of the invention wherein the measurement axis is aligned in parallel with the single camera axis. As shown in FIG. 3, the vertical measurement is aligned in parallel with the camera axis and the horizontal measurement is directed orthogonal to the camera axis. Stated another way, in this figure the hip height measurement is orthogonal to the camera axis and the hip width dimension is aligned with the camera axis. Similarly in this figure, the vertical, or hip height measurement is aligned in parallel with the illumination axis and the horizontal, or hip width measurement is directed orthogonal to the illumination axis.

Numerous optical calculations exist to calibrate the dimensions of the system illustrated in FIGS. 1, 2 and 3. However, the use of a calibrated, physical template provides a simple and direct calibration technique. By placing a 3D block or shape of known dimensions in the place of the target animal in FIGS. 1, 2 and 3, the data processor 34 can determine the proper calibration by scaling the measured distance in pixels to the proper physical measurements know to be possessed by the calibration shape.

Figure 4:
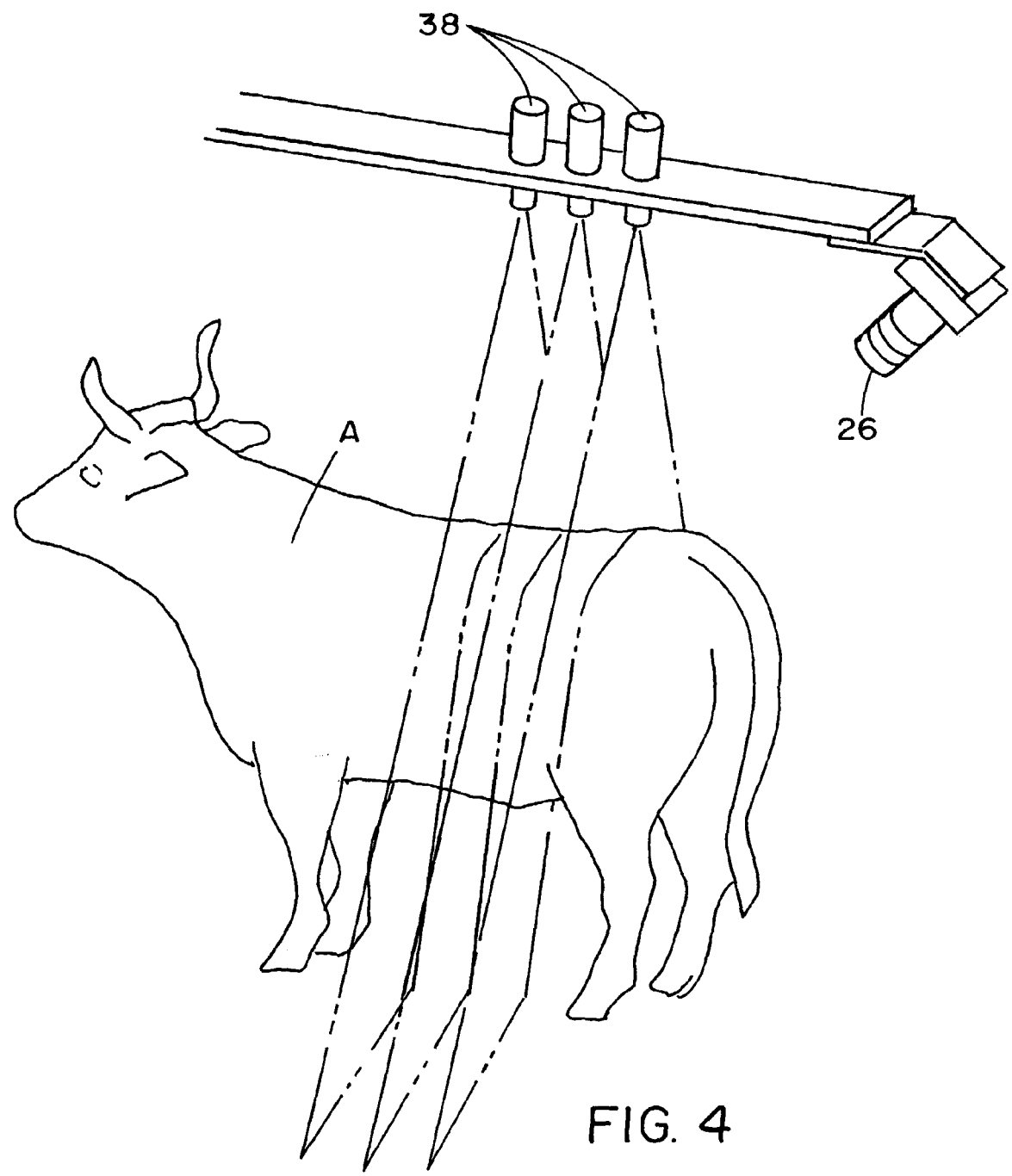
FIG. 4 is a generally perspective view illustrating the positioning of a plurality of structured light sources and a single camera for ascertaining the hip width and hip height of the target animal using triangulation.
Figure 5:
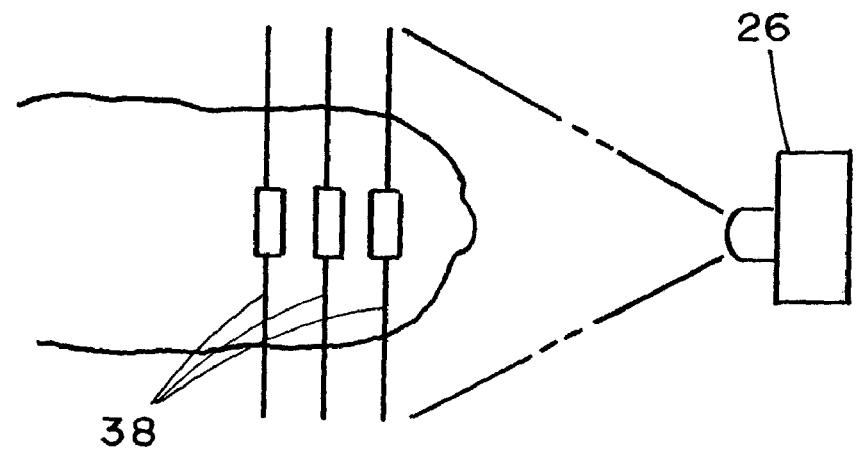
FIG. 5 is a generally diagrammatic top view further illustrating the use of the single camera and the cooperating structured light sources to ascertain the hip width and hip height of the target animal using triangulation.
Figure 6:
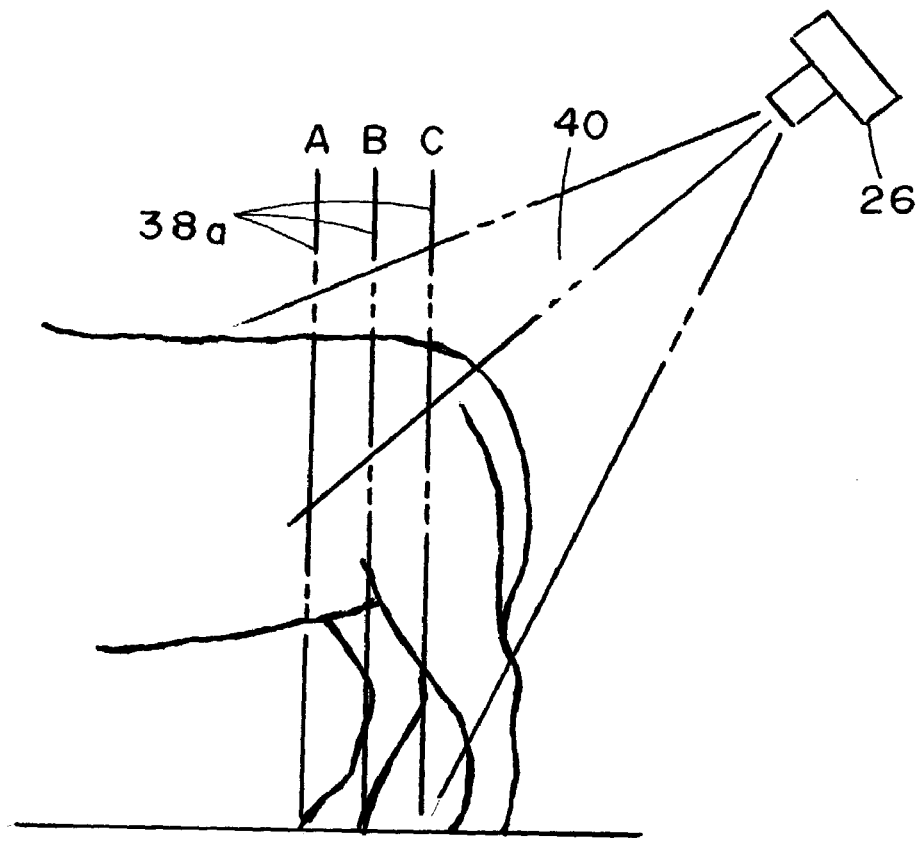
FIG. 6 is a generally diagrammatic side view further illustrating the use of the single camera and the cooperating structured light sources to ascertain the hip width and hip height of the target animal.

An alternate method of the invention involves the use of a single camera, such as a digital camera, with laser or structured light triangulation. One form of the apparatus used in carrying out this alternate method of the invention is shown in FIGS. 5 and 6. As indicated in FIG. 6, the light sources, which may comprise either laser or structured light sources 38, are aligned with the direction of the live stock measurement and triangulation is used to obtain the measurement aligned with the axial measurement. More particularly, as shown in FIGS. 4, 5 and 6, the axes of the light sources are aligned parallel with the vertical plane that bisects the midsagittal plane of the animal and are orthogonal to the hip width measurement. The single camera 26 is positioned behind and above the target animal with the camera axis aligned with the vertical plane that bisects the midsagittal plane of the animal and orthogonal to the hip width measurement. As indicated in FIG. 6, the camera axis is at an angle 40 to the vertical planes 38a of the light sources 38. It is to be understood that, while three light sources are shown in the drawings, any number of sources might be employed to cover the desired region of the target animal.

Figure 7:
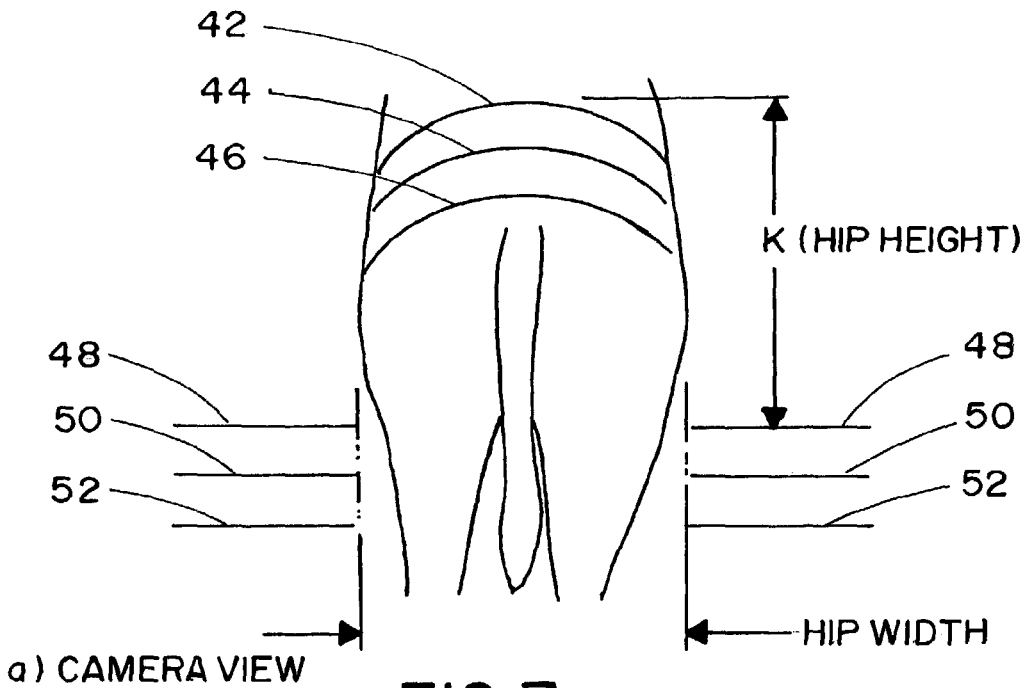
FIG. 7 is a generally diagrammatic view further illustrating the use of the single camera and the cooperating structured light sources, the pattern of which has been filtered through an optical bandpass filter, to ascertain the hip width and hip height of the target animal using triangulation techniques.
Figure 8:
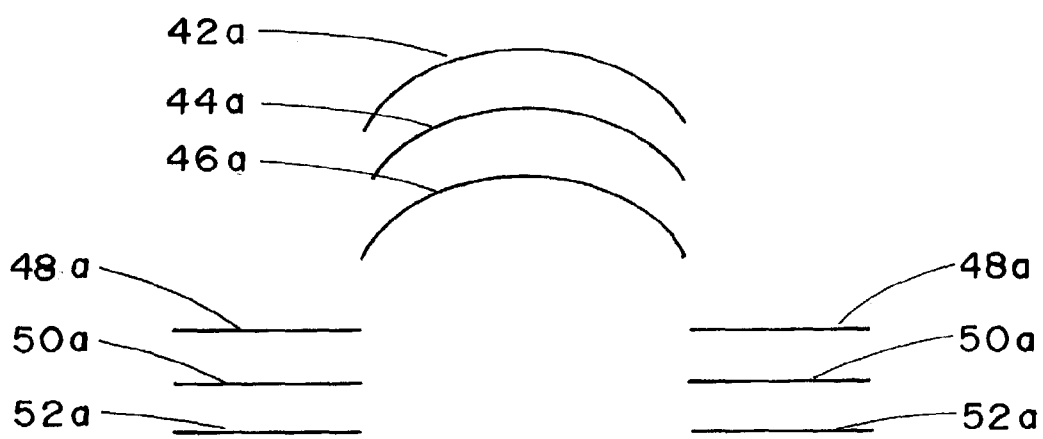
FIG. 8 is a generally diagrammatic view similar to FIG. 7, but showing only the pattern projected by the structured light sources as viewed through an optical bandpass filter which passes only the light source wavelength.

FIG. 7 shows the laser stripes superimposed on the target animal. The hip height is determined from the separation between lines 42, 44 and 46 superimposed on the back of the animal, and those respective same lines on the floor as indicated by lines 48, 50 and 52. The distance on the camera image is k times the actual hip height, where k is a calibration scalar. FIG. 8 shows the same laser stripes as viewed through a laser bandpass filter which removes ambient light accentuating only the laser stripes. As shown in FIGS. 7 and 8, the hip width is determined by the separation of the floor stripes 48, 50 and 52 or the width of the curved, stripes 42, 44 and 46 superimposed on the back of the target animal.

The laser triangulation system described in the preceding paragraph for measuring livestock, specifically cattle and hogs, may be easily calibrated by simply placing an object of known dimensions in the target area and mathematically determining coefficient k for hip height and an equivalent scalar for the hip width.

FIG. 8 shows the same laser stripes as stripes 42, 44, 46, 48, 50 and 52, but viewed through a bandpass filter which removes ambient light accentuating only the laser stripes. These latter stripes are identified in FIG. 8 by the numerals 42a, 44a, 46a, 48a, 50a, and 52a, The image of FIG. 8 is somewhat simpler to process since only information of value exists. In this latter case, the hip width is determined by the separation of the floor stripes 48a, 50a and 52a, or by the width of the curved, stripes 42a, and 44a. and 46a on the back of the target animal.

Figure 9:
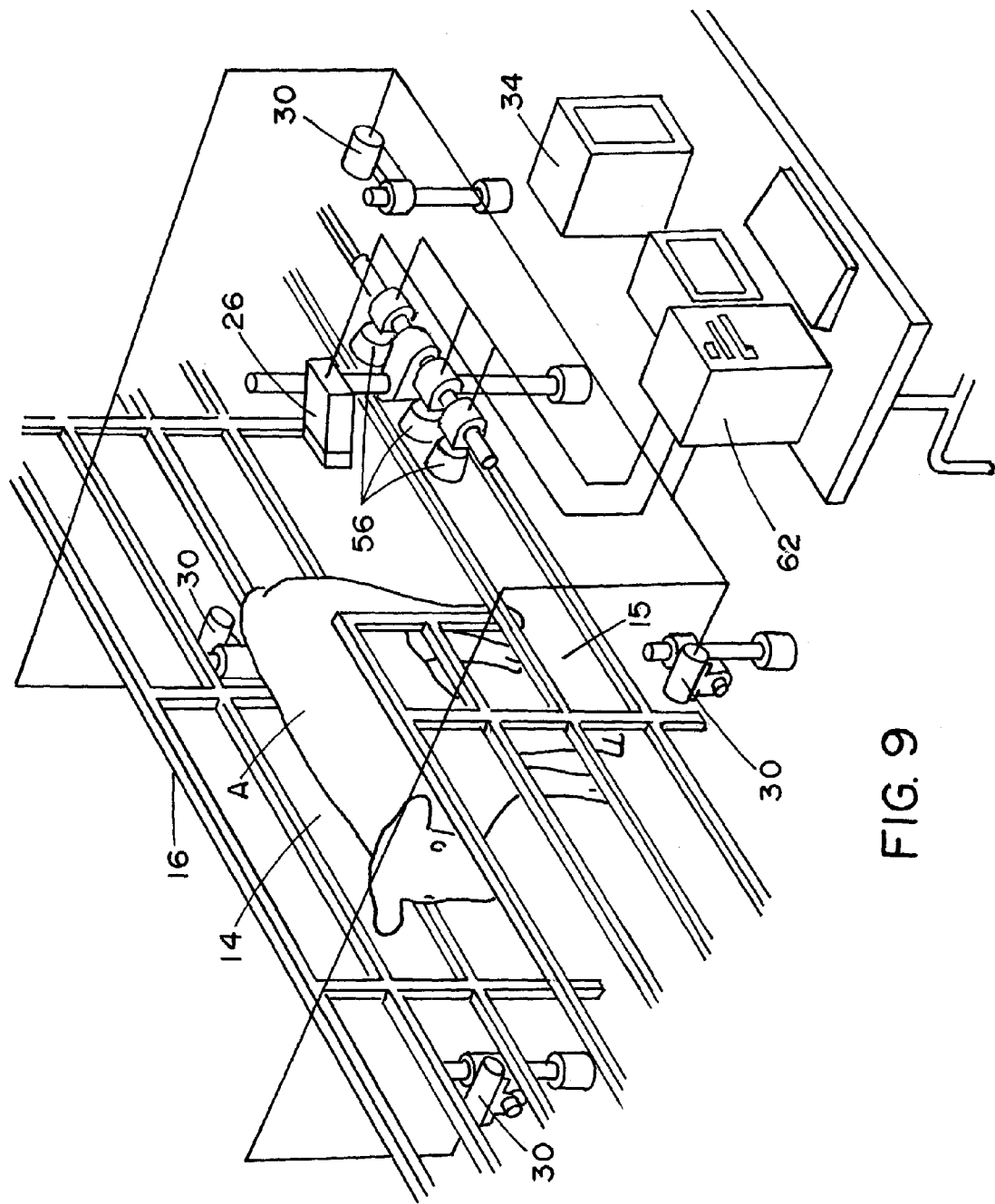
FIG. 9 is a generally perspective view of an alternate form of the apparatus of the invention for measuring the height of a livestock animal using a single camera.
Figure 10:
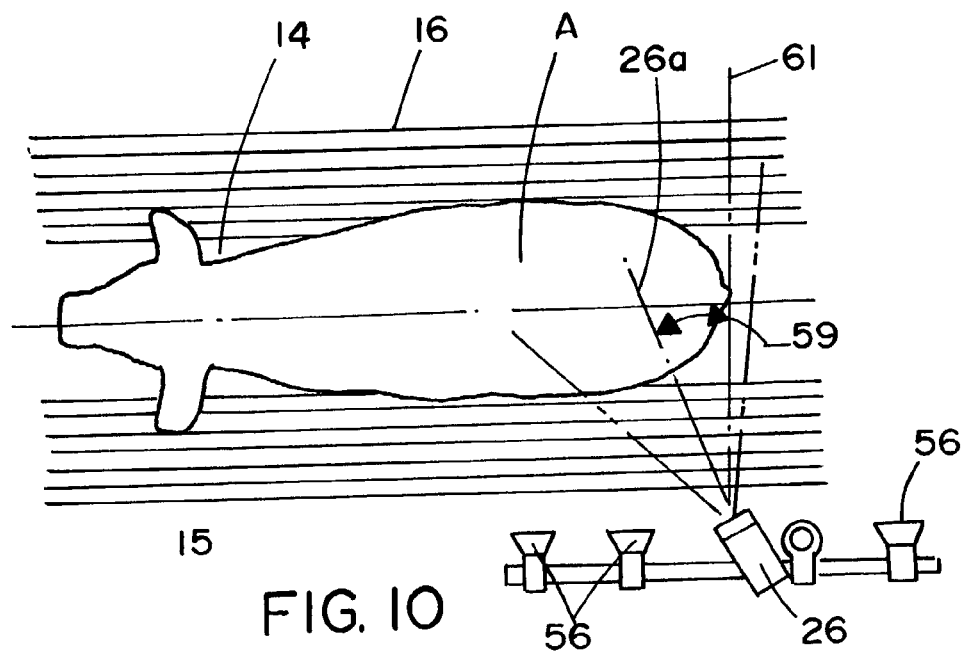
FIG. 10 is a top plan view of the apparatus of the invention shown in FIG. 9.
Figure 10A:
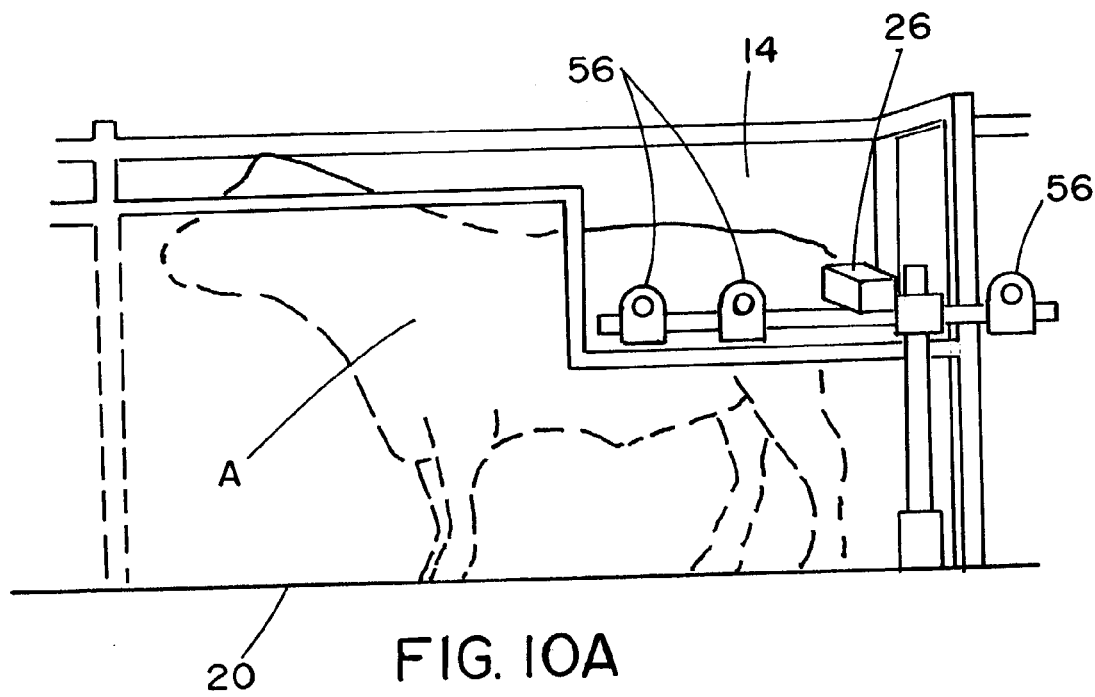
FIG. 10A is a side view of the apparatus shown in FIG. 9
Figure 11:
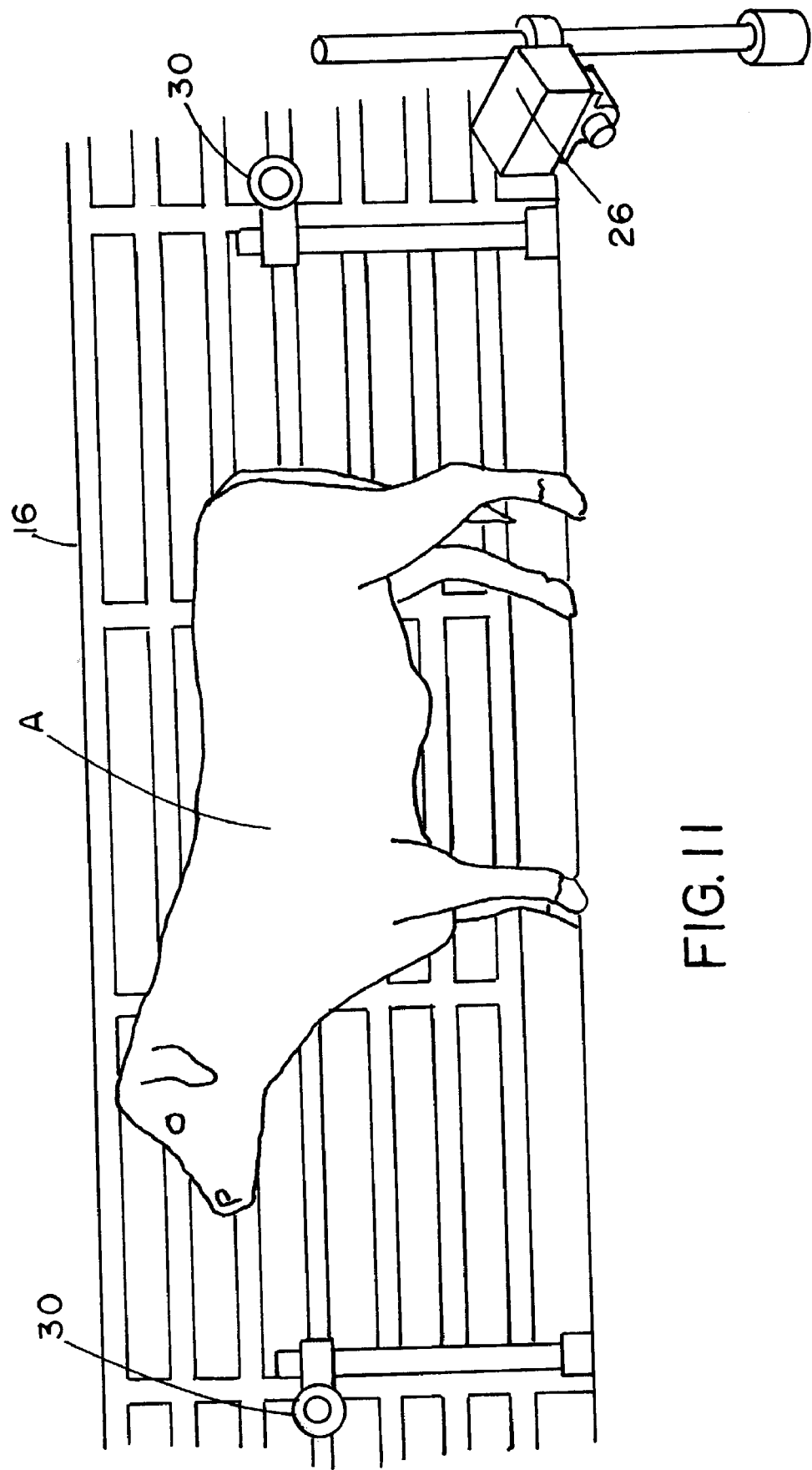
FIG. 11 is a side view of the apparatus of the invention similar to that shown in FIG. 10A, but with the front portion of the structural means of the invention removed from view.

Turning next to FIGS. 9, 10 and 11 still another form of the apparatus of the invention for obtaining desired dimensional measurements, is there shown. The apparatus of this form of the invention is similar in some respects to the apparatus shown in FIGS. 1 through 3 and like numbers are used to identify like components. This latter form of the apparatus comprises a single camera system with transverse illumination. In this system the centerline 26a of the camera 26 is at an angle 59 with respect to a plane 61 that is substantially perpendicular to the midsagittal plane of the animal and the light sources 56 are aligned in parallel with plane 61 (FIG. 10).

As before, numerous optical calculations exist to calibrate the dimensions of the system illustrated in FIGS. 9, 10 and 11. However, the use of a calibrated, physical template provides a simple and direct calibration technique. By placing a 3D block or shape of known dimensions in the place of the target animal in FIGS. 9, 10 and 11, the data processor 34 along with the computer 62 (FIG. 9) can determine the proper calibration by scaling the measured distance in pixels to the proper physical measurements know to be possessed by the calibration shape. Although the image acquisition is of only one-half the animal, use of a proper algorithm can reasonable estimate the width of the animal Turning next to FIGS. 12, 13, 14 and 15 still another form of the apparatus of the present invention is there illustrated. In this embodiment of the invention an overhead camera 64 is aligned in parallel with the midsagittal plane of the animal, while the illumination source 66 is aligned in parallel with a plane that is substantially perpendicular to the midsagittal plane of the animal. An opaque, white projection screen 68 is positioned on the not opposite side of the target animal and extends upwardly an angle 70 of approximately 45 degrees with respect to vertical. This novel arrangement permits the overhead camera 64 to view the shadow "S" of the target animal with side illumination. It is apparent that as the hip height of the target animal increases the shadow moves up the screen.

Figure 12:
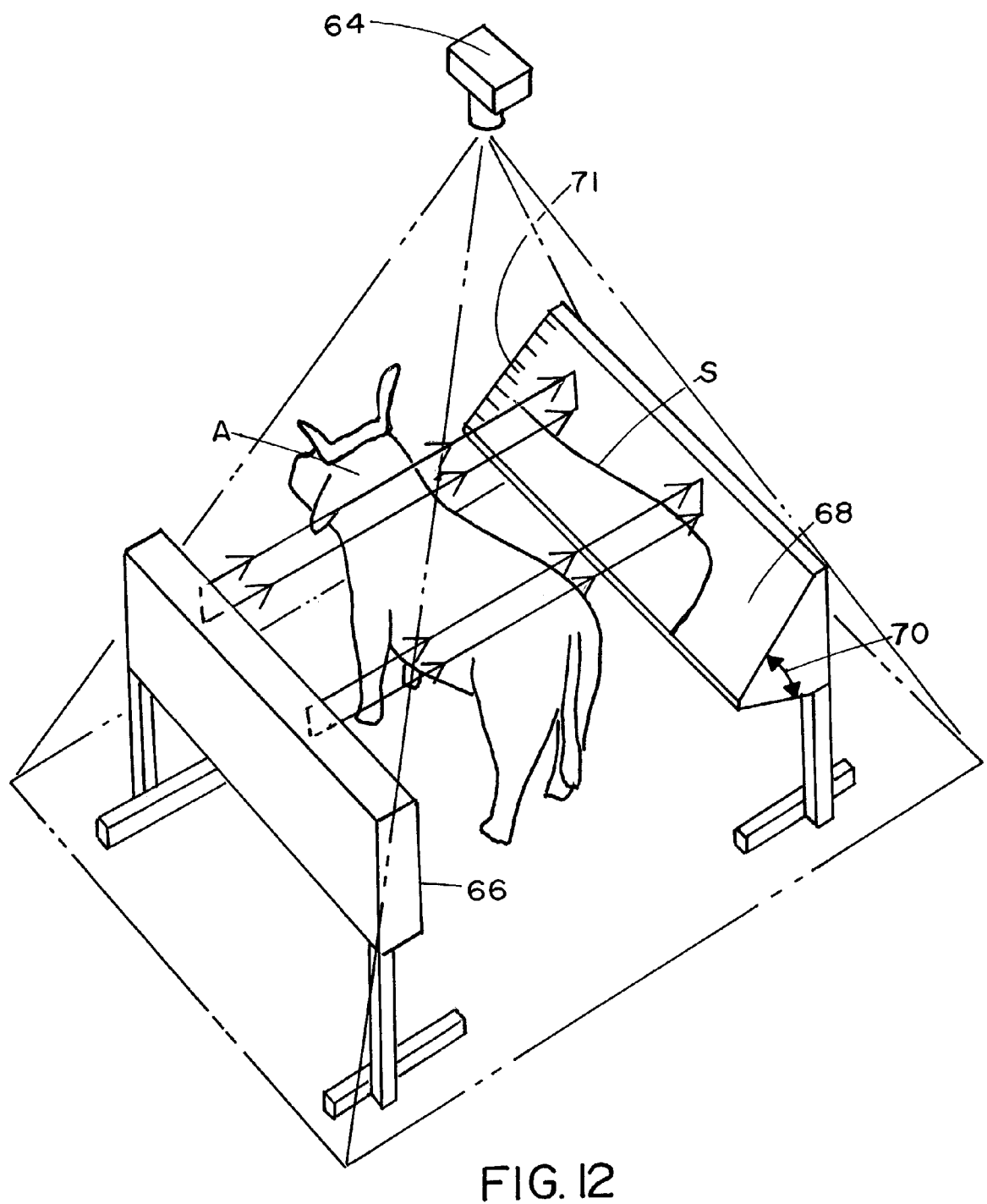
FIG. 12 is a generally perspective view of an alternate form of the apparatus of the invention for determining the hip height and the hip width of the target animal using a top-view camera, transverse lighting and an angled screen.
Figure 13:
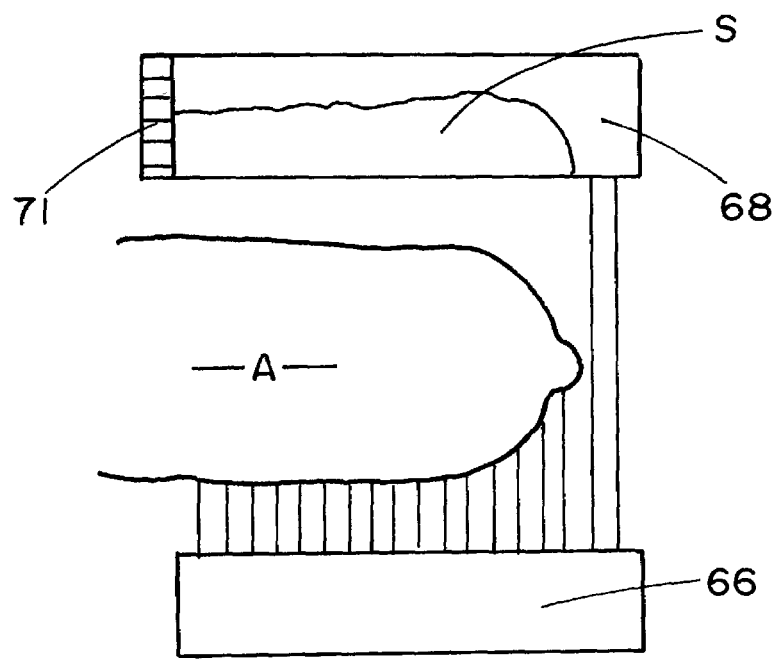
FIG. 13 is a fragmentary top view of the apparatus shown in FIG. 12.
Figure 14:
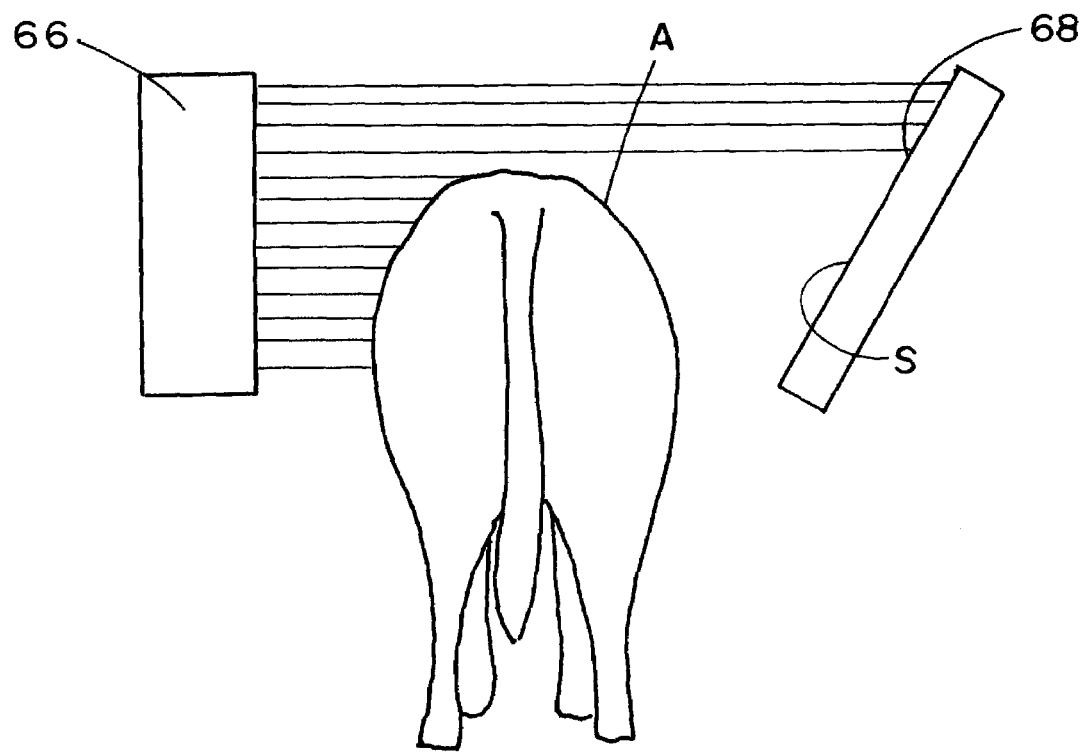
FIG. 14 is a fragmentary end of view of the apparatus shown in FIG. 12.
Figure 15:
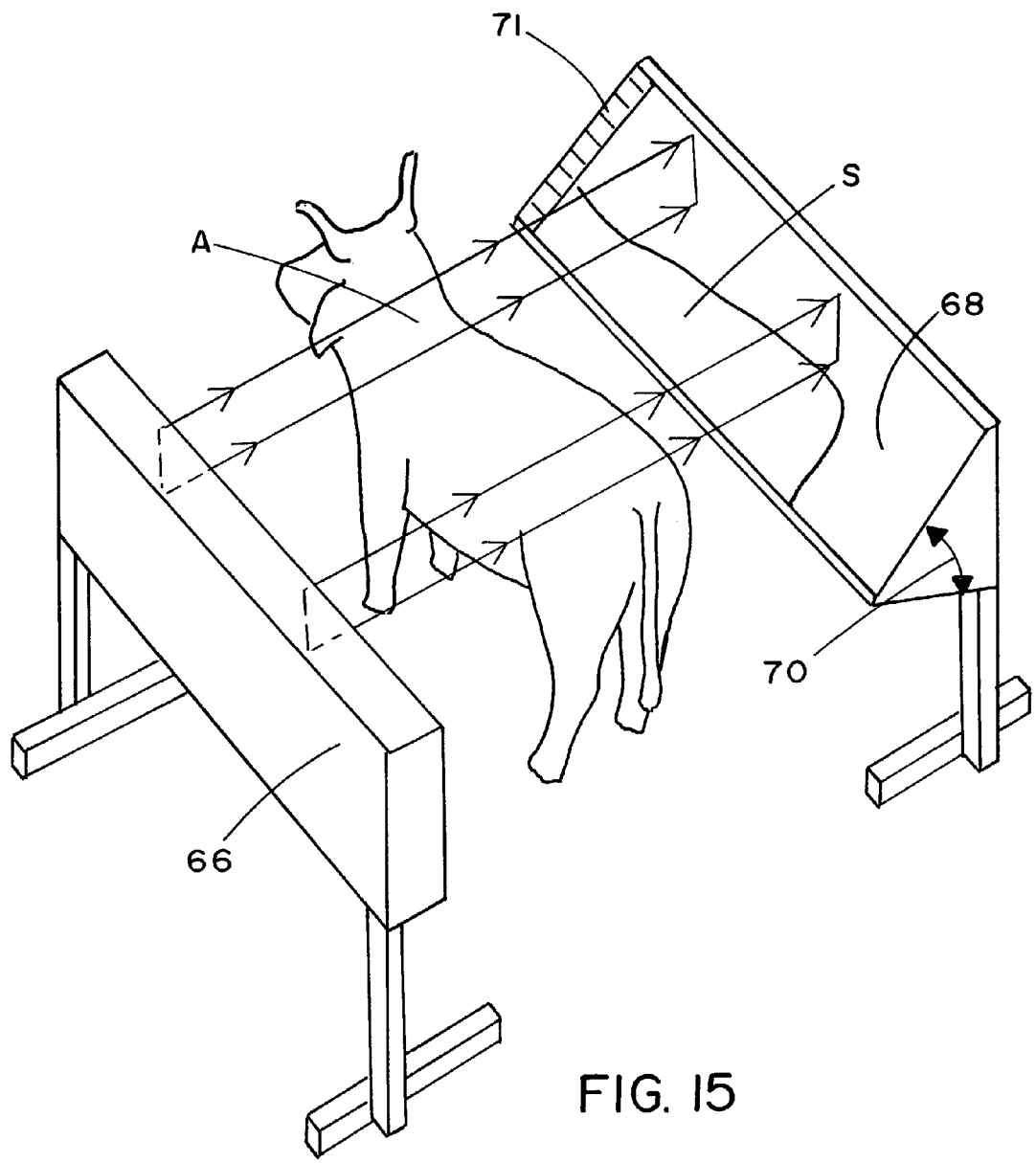
FIG. 15 is a generally perspective view of the alternate form of the apparatus shown in FIG. 12, but only showing the lower portion of the apparatus.

FIGS. 13 and 14 show a top plan and a rear view of this layout shown in FIG. 12 and illustrate how the hip width can be measured by computing the hip width within the recorded image and converting that image width into a true hip width measurement. This calibration may be accomplished by many optical calculations known to those skilled in the art or via a simple recording of known object heights with their corresponding image sizes. As depicted in FIG. 13, the hip height can be computed based upon the percentage of the screen covered with the shadow of the target animal. In this regard, a small calibration scale 70 may be provided on the left side of the screen for operator convenience.

Figure 16:
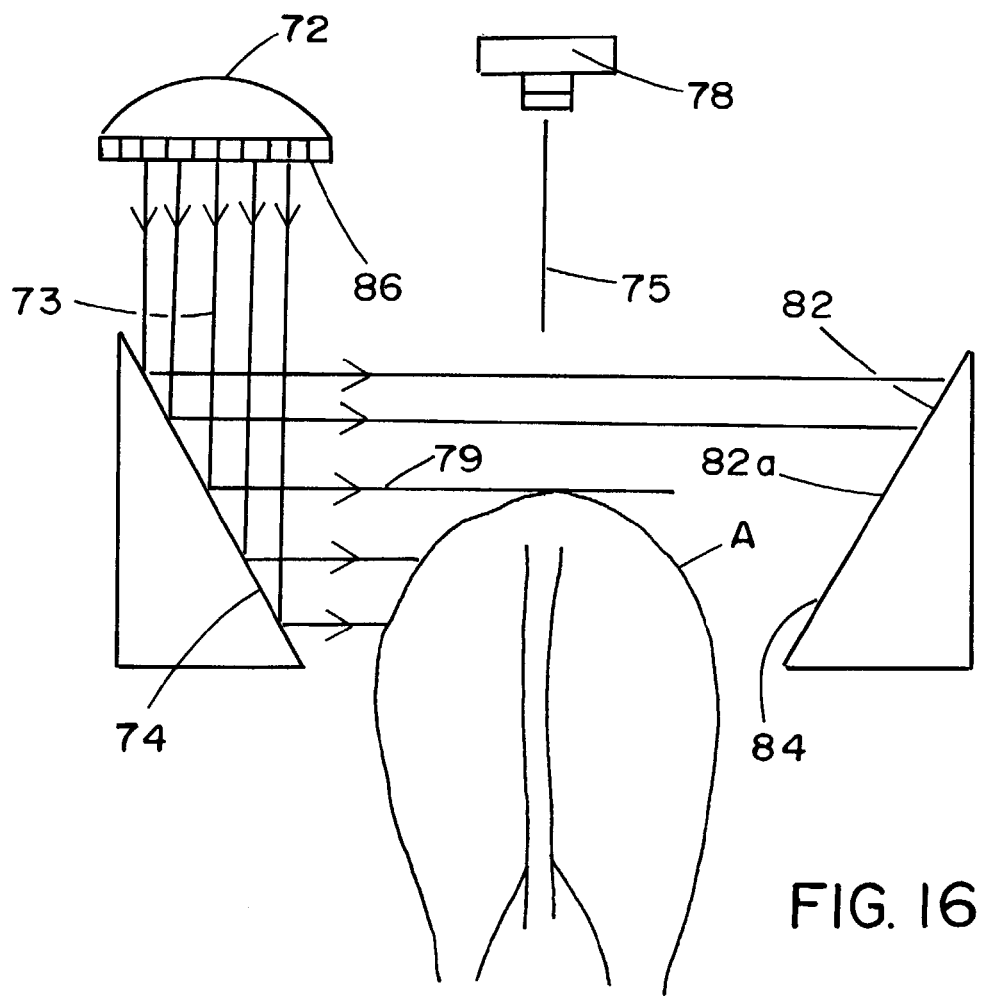
FIG. 16 is a generally diagrammatic view of still another form of the apparatus of the invention for determining the hip height and the hip width of the target animal using a vertical light source, angled opaque screen, angled mirror surface and top-view camera.
Figure 17:
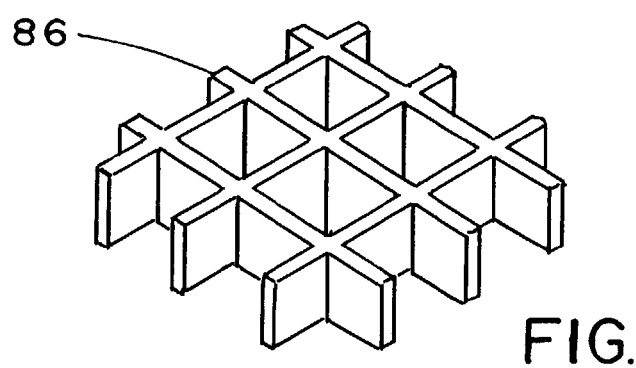
FIG. 17 is a greatly enlarged generally perspective fragmentary view of the lens system used in conjunction with the light source shown in FIG. 16 to reduce diffusion of the light path.

FIGS. 16 and 17 illustrate yet another embodiment of the apparatus of the invention for obtaining dimensional data of a target animal. Referring particularly to FIG. 16, this latest form of the invention comprises a fluorescent light system 72 that is superimposed over a diffuse, white screen 74. The original axis 73 of the fluorescent light system is in parallel with the axis 75 of an overhead camera 78. However, the lighting axis 79 is redirected to the transverse or orthogonal direction via the angled white screen 74. The lighted area is visible from overhead camera 78 via an angled mirror 82 that is positioned on the opposite side of the target animal from the white screen 74. As indicated in FIG. 16, the back of the target animal blocks the light in the lower region of the mirror thus making the height visible in silhouette form 84 and measurable from above the mirror surface 82a. A lens system 86, which is affixed to the fluorescent fixture helps avoid diffusion of the fluorescent light source. The construction of the light source lens system 86 is generally illustrated in FIG. 17. However, it is to be understood that various types of the lens system is well known to those skilled in the art could be used in place of lens system 86.

Figure 18:
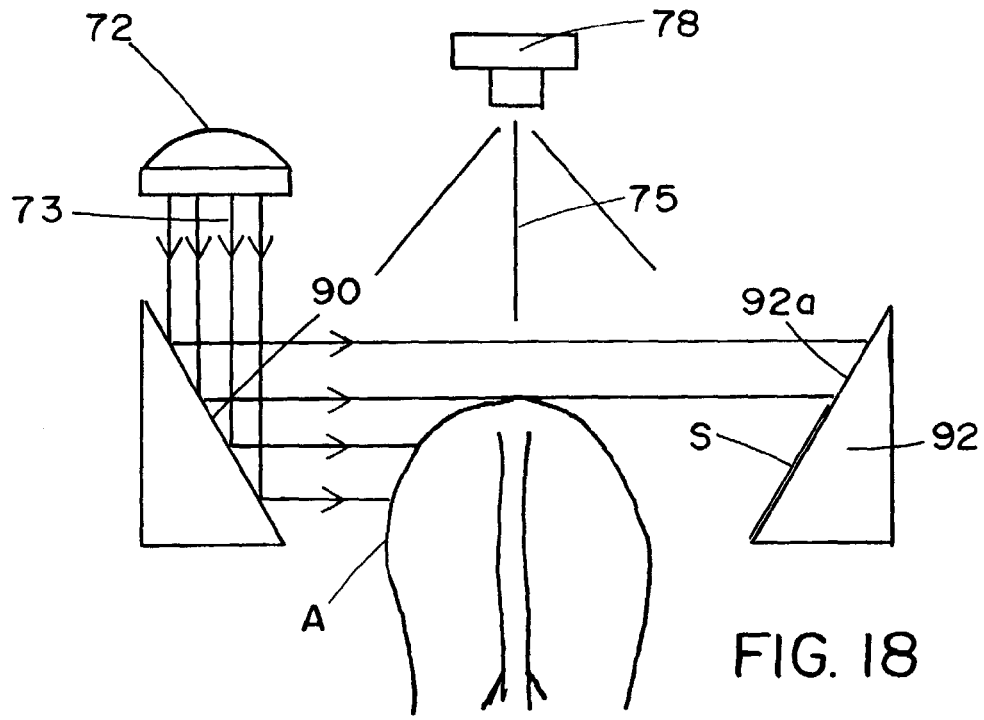
FIG. 18 is a generally diagrammatic view of yet another form of the apparatus of the invention for determining the hip height and the hip width of the target animal using a vertical source, angled mirror, angled opaque screen, and top-view camera.

Turning next to FIG. 18 still another form of the apparatus of the invention is there shown. This apparatus is similar in many respects to that shown in FIG. 16 and like numerals are used in FIG. 18 to identify like components. This latest form of the invention, like that shown in FIG. 16, comprises a fluorescent light system 72. However, in this construction the light system 72 is superimposed over a mirror surface 90 instead of the angled, white screen 74 shown in FIG. 16. With this construction, the mirror surface 90 reflects the light across the back of the target animal forming a shadow "S" on the angled screen 92 that is positioned on the opposite side of the target animal from mirror surface 90. As before, the original axis 73 of the fluorescent light system is in parallel with the axis 75 of an overhead camera 78. However, the lighting axis 79 is redirected to the transverse or orthogonal direction via the angled mirror surface 90. As indicated in FIG. 18, the back of the target animal blocks the light in the lower region of the angled screen 92 making the height visible in silhouette form on angled screen 92 and measurable from above the screen surface 92a. The top-view camera 78 records the height of the shadow on the angled screen and computes the hip height accordingly. A light source lens system 86, of the character previously described is affixed to the fluorescent fixture to help avoid diffusion of the fluorescent light source.

Figure 19:
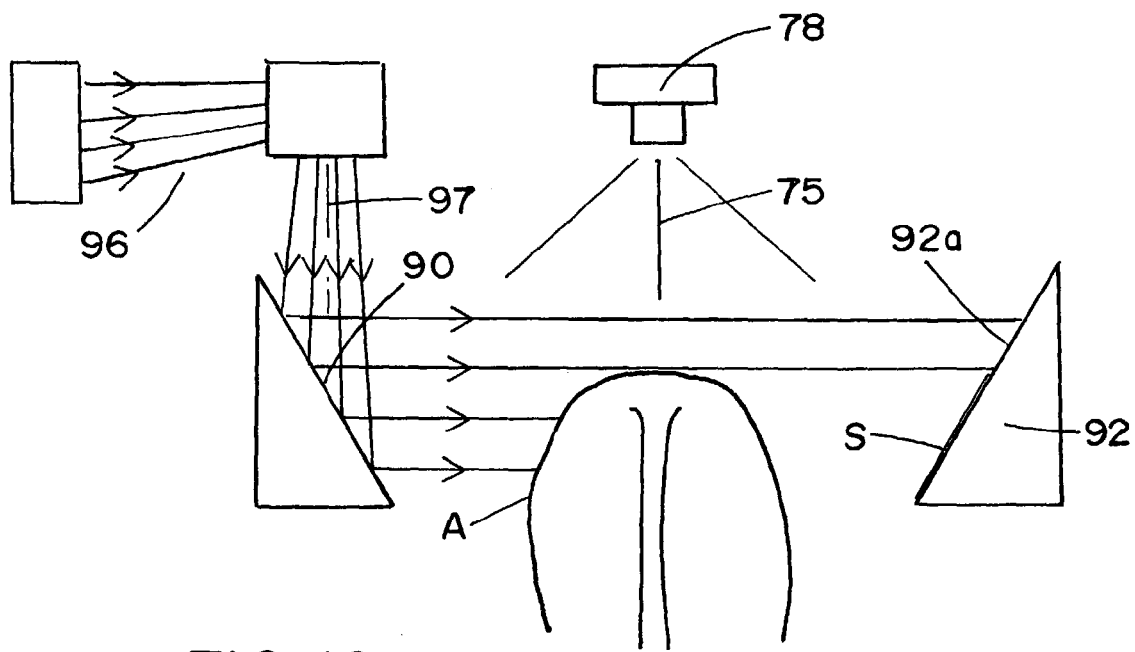
FIG. 19 is a generally diagrammatic view of still another form of the apparatus of the invention for determining the hip height and the hip width of the target animal.

Referring to FIG. 19 yet another form of the apparatus of the invention is there shown. This apparatus is similar in many respects to that shown in FIG. 18 and like numerals are used to identify like components. The main difference between the apparatus of FIG. 19 and that shown in FIG. 18 resides in the fact that the fluorescent light 86 source is replaced by a projection system 96 such as that used in a conventional, readily commercially available overhead projector. With this construction, the mirror surface 90 reflects the light across the back of the target animal forming a shadow "S" on the angled screen 92 that is positioned on the opposite side of the target animal from mirror surface 90. As indicated in FIG. 19, the original axis 97 of the overhead projector system is in parallel with the axis 75 of an overhead camera 78. However, the lighting axis 97 is redirected to the transverse or orthogonal direction via the angled mirror surface 90. As indicated in FIG. 19, the back of the target animal blocks the light in the lower region of the angled screen 92 making the height visible in silhouette form on angled screen 92 and measurable from above the screen surface 92a. The top-view camera 78 records the height of the shadow on the angled screen and computes the hip height accordingly.

Figure 20:
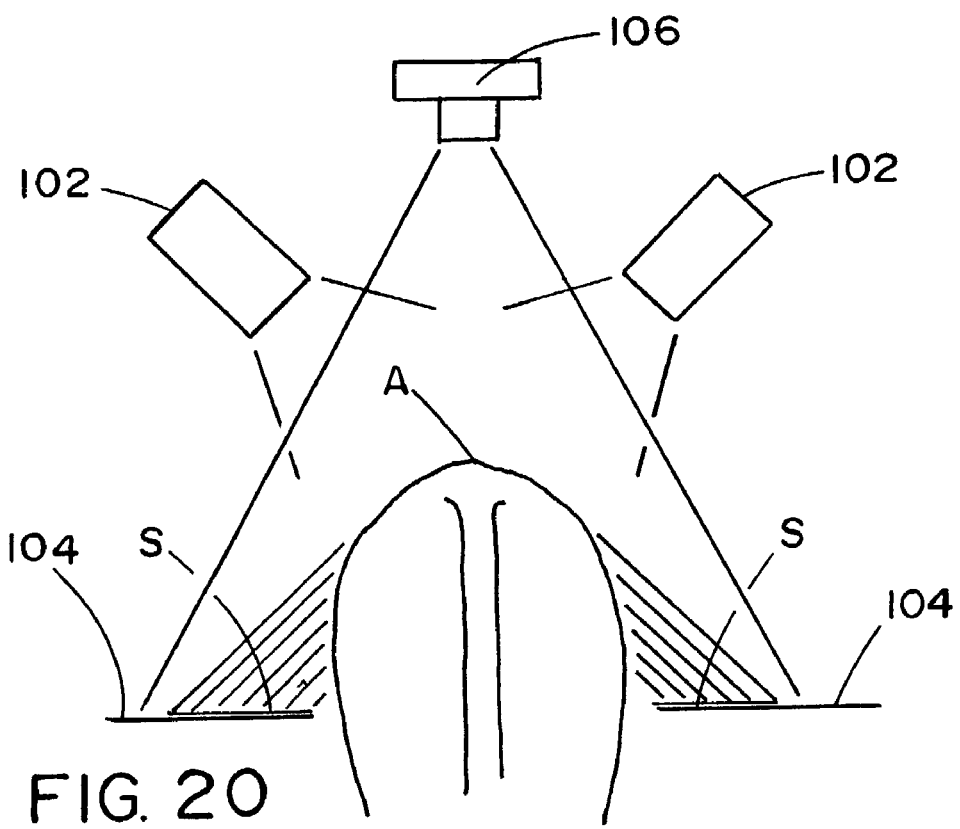
FIG. 20 is a generally diagrammatic view of yet another form of the apparatus of the invention for determining the hip height and the hip width of the target animal.

Turning next to FIG. 20 still another form of the apparatus of the invention is there shown. This latest form of the invention comprises first and second side illumination means, here comprising identical first and second flash units 102 that are disposed above and on either side of the target animal "A". These flash units are not energized simultaneously and, therefore, alternate their flash timing. Strategically positioned on either side of the target animal are white reflective surfaces 104. These reflective surfaces are positioned so that when illuminated each of the flash units forms a shadow "S" on the reflective surfaces 104. The height of the target animal can be determined by observing and measuring the length of the cast shadows on the opposite side of the animal. More particularly, an overhead, visible spectrum camera 106, the central axis of which is aligned with the midsagittal plane of the animal "A", obtains images from which the length of the cast shadows and thus the height of the animal can readily be determined.

Figure 21:
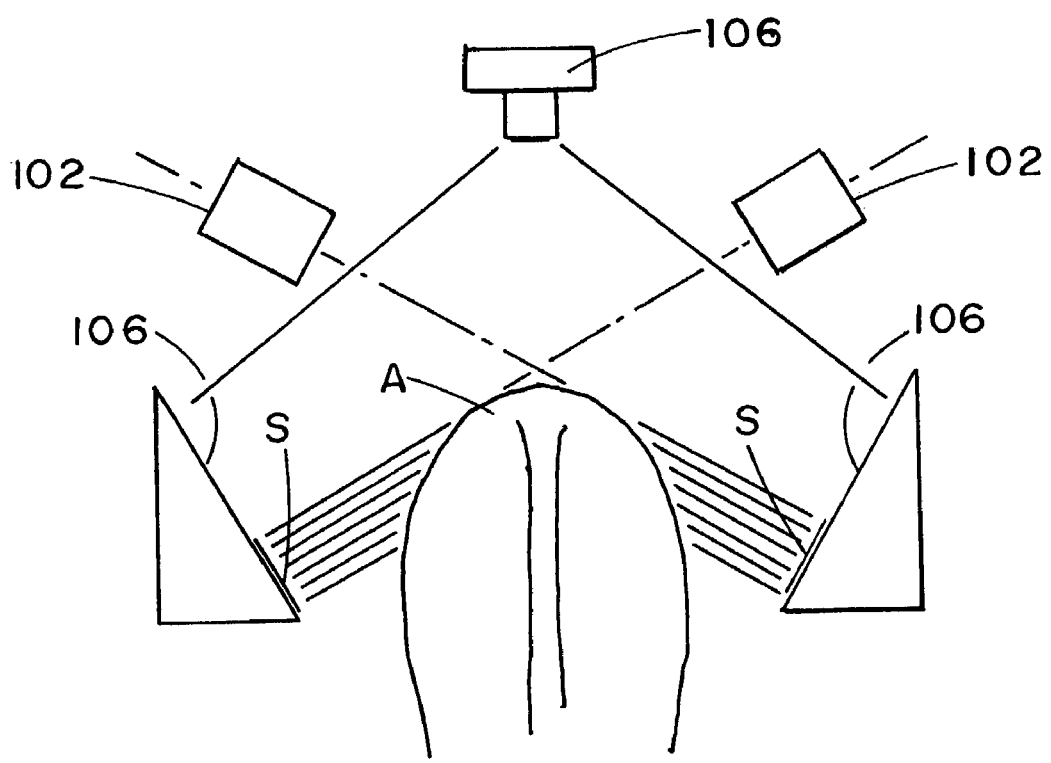
FIG. 21 is a generally diagrammatic view of still another form of the apparatus of the invention for determining the hip height and the hip width of the target animal.

Referring to FIG. 21, yet another form of the apparatus of the invention is there shown. This apparatus is similar in many respects to that shown in FIG. 20 and like numerals are used to identify like components. The main difference between the apparatus of FIG. 21 and that shown in FIG. 20 resides in the fact that the white reflective surfaces 106, which are positioned on either side of the target animal, are inclined angularly upwardly, rather than being substantially horizontal as in the case of the reflective surfaces 104 of FIG. 20. As indicated in FIG. 21, reflective surfaces 106 are positioned so that when illuminated each of the flash units 102 forms a shadow "S" on the reflective surfaces 106. The height of the target animal can be determined by observing and measuring the length of the cast shadows on the opposite side of the animal. More particularly, an overhead, visible spectrum camera 106, the central axis of which is aligned with the midsagittal plane of the animal "A", obtains images from which the length of the cast shadows and thus the height of the animal can readily be determined.

Figure 22:
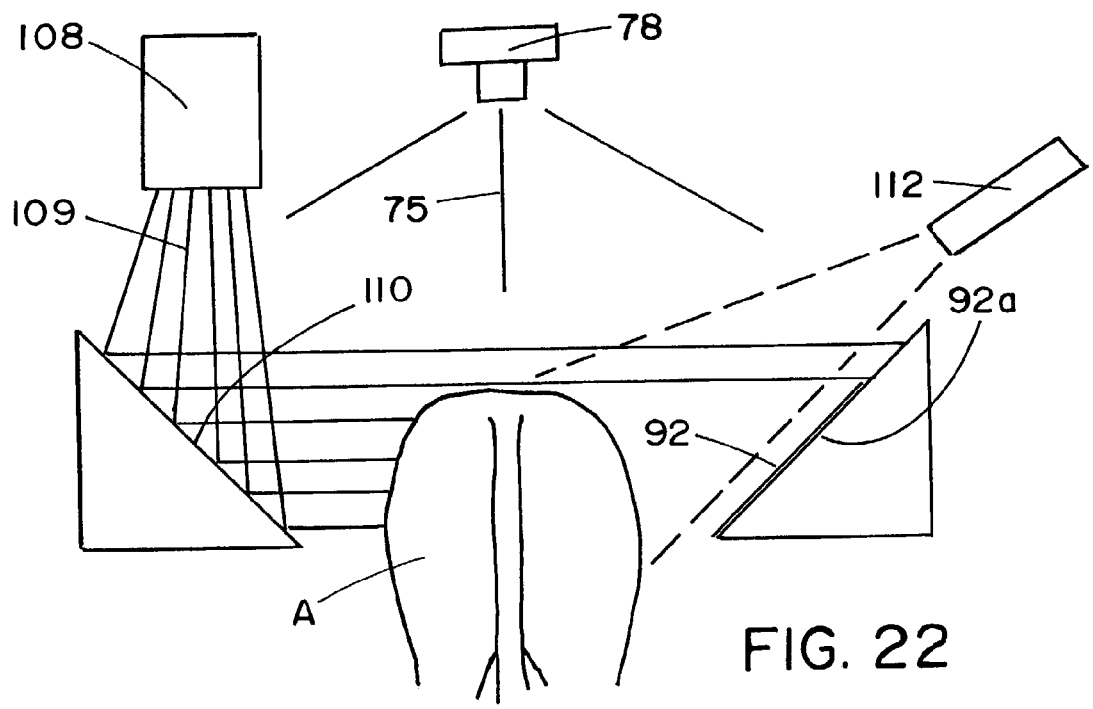
FIG. 22 is a generally diagrammatic view of yet another form of the apparatus of the invention for determining the hip height and the hip width of the target animal.
Figure 23:
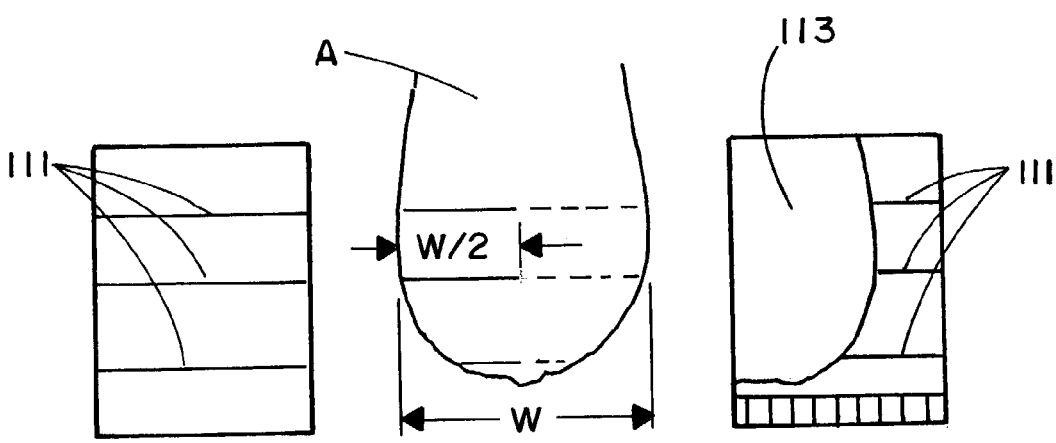
FIG. 23 is a generally diagrammatic top view of the apparatus of the invention shown in FIG. 22.
Figure 24:
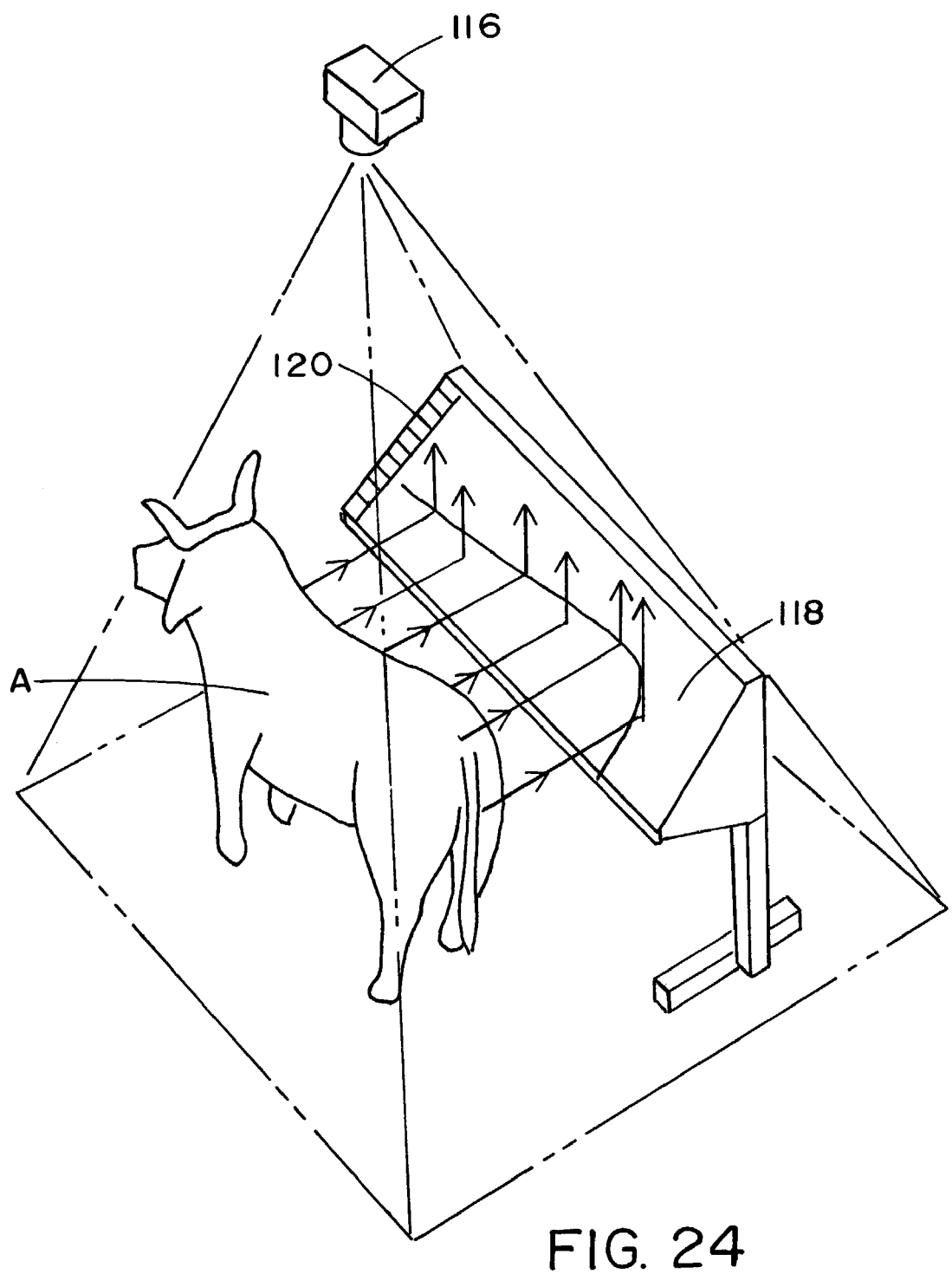
FIG. 24 is a generally perspective view of still another form of the apparatus of the invention for determining the hip height and the hip width of the target animal.
Figure 25:
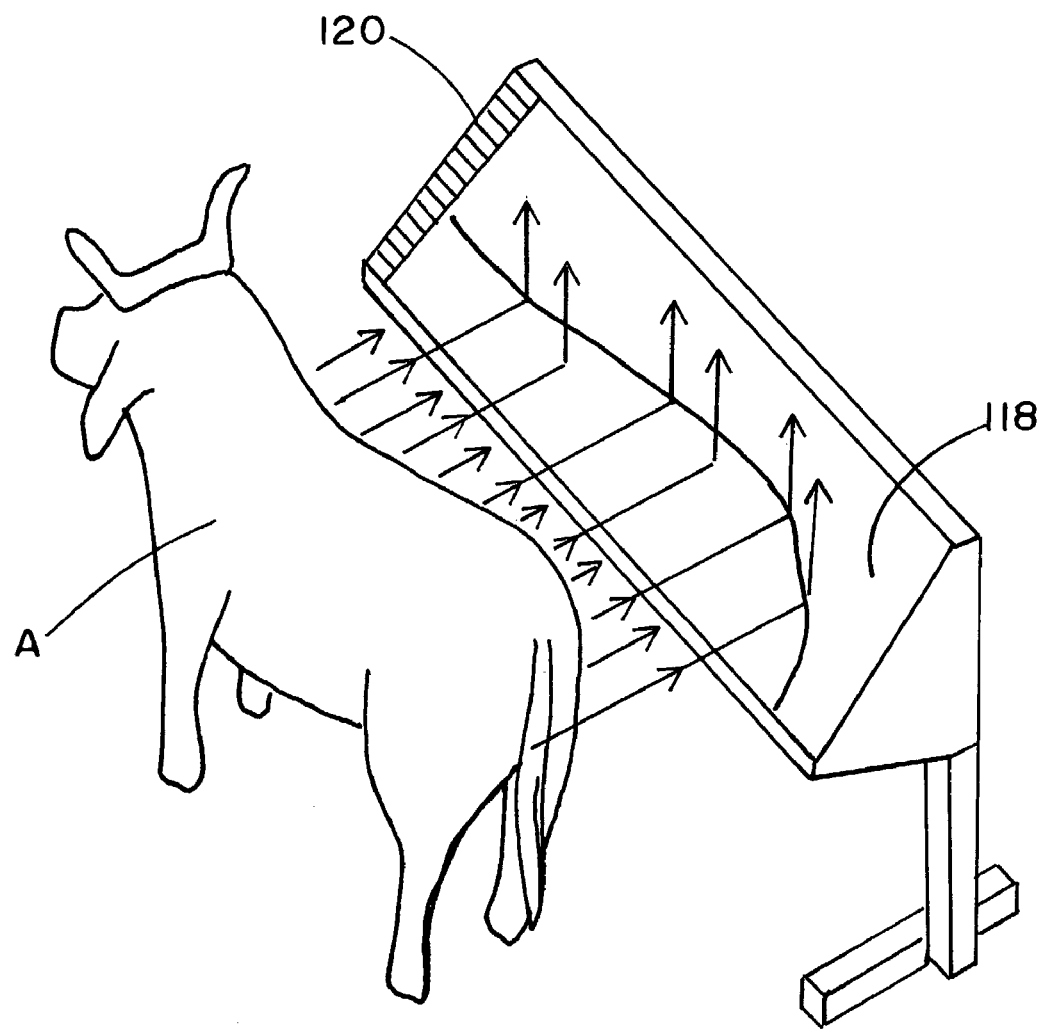
FIG. 25 is a generally perspective view of the alternate form of the apparatus shown in FIG. 24, but only showing the lower portion of the apparatus.
Figure 26:
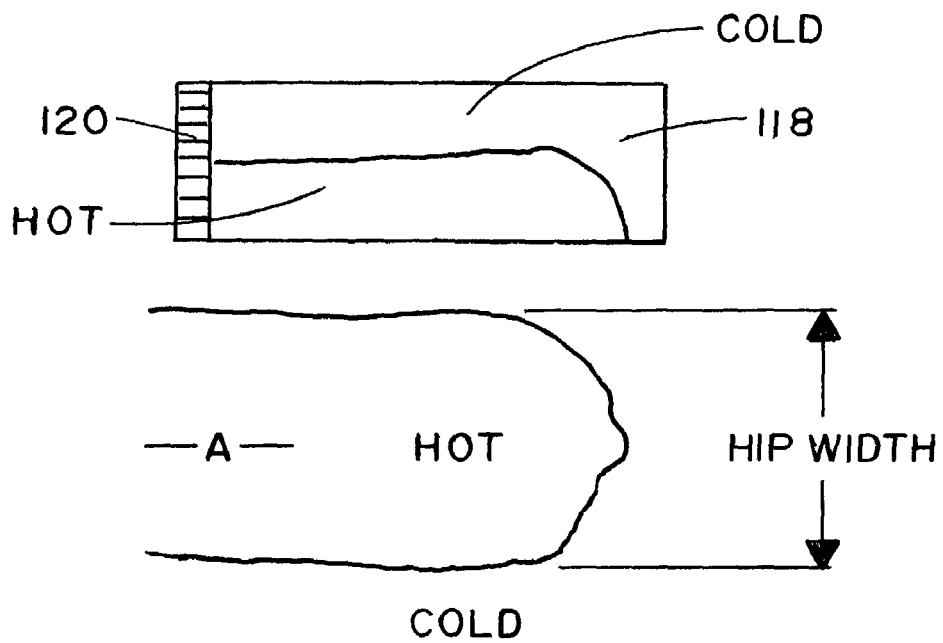
FIG. 26 is a fragmentary top view of the apparatus shown in FIG. 25.

Turning next to FIGS. 22 and 23, still another form of the apparatus of the invention is there shown. This apparatus is similar in many respects to that shown in FIG. 18 and like numerals are used in FIG. 18 to identify like components. This latest form of the invention the light system comprises a series of three laser plane sources generally designated by the 108. As shown in FIG. 22 the three laser plane sources 108 are aligned above a planar, angled mirror surface 110 which exhibits laser stripes 111 (FIG. 23) which are passed over the back of the target animal and are projected on the surface 92a of the angled screen 92. The length of the laser stripes appearing on surface 92a varies inversely with the height of the animal. A backside light source 112 illuminates the side of the target animal opposite that which is adjacent the mirror surface 110 an casts back source stripes 113 on surface 92a (FIG. 23). The backside illumination from light source 112 enables the top-view camera 78 to view both sides of the animal to enable an accurate determination of hip width. It is to be noted that the illumination angle of the back side light source 112 must be controlled so that the illumination does not fall on the white screen in a manner to impinge on the necessary shadow from the opposite side.

If backside illumination is not used, the hip width can be computed from half the true measurement with a drop in surface illumination in the center of the animals back due to the illumination angle at just that surface position.

Figure 27:
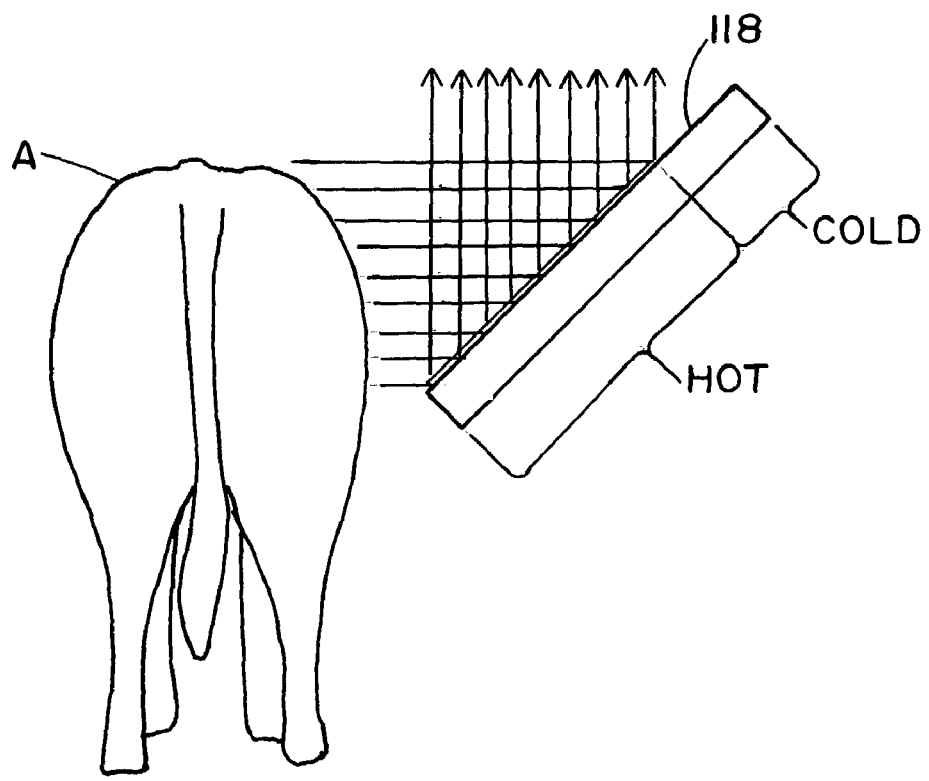
FIG. 27 is a fragmentary rear view of the apparatus shown in FIG. 25.

Referring to FIGS. 24, 25, 26 and 27, still another form of the apparatus of the present invention is there illustrated. In this embodiment of the invention an overhead infrared (IR) camera 116 is aligned in with the midsagittal plane of the animal and an IR reflective surface 118 is positioned on one side of the target animal "A". The target animal radiates infrared (thermal) energy in all directions so that, as illustrated in the drawings, the orthogonal measurement, namely, the hip width of the animal can accurately be determined from an image captured by the camera 116. In this regard, as illustrated in FIG. 27, the radiated IR may be reflected from the IR reflective surface 118 so that the IR camera can record a side image of the animal from the top view. A scale 120 can be attached to the side of the reflector for operator convenience.

One IR camera which is suitable for use in the present application and one which provides a quality thermal image is the camera developed and manufactured by Infrared Solutions, Inc. and sold under the name and style "IR SnapShot™". This camera employs a low-cost, uncooled, scanned linear array of thermoelectric thermal sensors. It provides a thermal image, which is 120×120 pixels, based on radiated IR in the 8 to 12 µm spectral band. Each pixel has 12 bits of useable resolution. The accuracy is specified at ±2 C. or 2% of the reading. The camera may be controlled via an RS-232 serial port and images stored on a resident flash card or downloaded via the serial link to a laptop or personal computer. The unit may be either line or battery powered.

As previously discussed here in connection with the earlier described embodiments of the invention, it is necessary to position the target animal (or whole carcass) in a proper position with respect to the target area and with respect to the thermal camera. As before, this is accomplished via a series of chutes which in a single file manner, direct the target animals into the proper position. Proximity sensor automatically alerts the system when the animal is within the designated target zone. These proximity sensors may take a number of different forms. They may include a light transmitter and receiver, which indicate proximity by breaking a visible or infrared beam. They may also include ultrasonic or infrared motion detection in a very limited region in front of each proximity detector.

A data processing unit, such as unit 34, takes as input, the signals from the proximity sensors that identify when the target animal is within the target zone. This control unit, in turn, outputs trigger signals to initiate image capture procedures by the thermal imaging cameras. This control unit may consist of discrete digital circuitry, digital and analog circuitry, microprocessor-based circuitry. The control function may also be combined with the image processing function within the processing unit.

In yet another form of the method of the invention for obtaining the desired livestock or whole carcass dimensional measurements, a range camera 124 (FIG. 28) can be used. For the purposes of this application a range camera is a device that provides a three-dimensional surface map within its field of view such that the distances from the surface to the camera plane are provided. It is advantageous for the range camera used as part of this invention to have a number of specific characteristics. These characteristics include fast image acquisition or shutter speeds, structured light systems which project pre-selected patterns on the targets, both slow or fast frame rates, color image capability, and standby image feed to assist with animal alignment. In the accomplishment of the method of the invention, the image acquisition rate is largely a function of camera selection, but is preferably on the order of several milliseconds.

As previously mentioned, while various commercially available cameras can be used in accomplishing this latest method of the invention, a camera manufactured by the Nikon, Inc. with the model designation "D1x" as well as a camera manufactured by Canon, Inc. having the model designation "EOS-1D" are suitable for use in the practice of the invention. These cameras are single lens reflex (SLR), digital cameras and both are capable of stopping any motion on an individual image with shutter speeds of up to 1/16000 of a second. The resolution of the "DX1" and the "EOS-1D" are 5.74 megapixels and 4.48 megapixels, respectively. Both may be controlled by computer via an Institute of Electrical and Electronics Engineers (IEEE) 1394 interface and both accept a wide assortment of interchangeable lenses. The "DX1" and "EOS-D1" can store 9 frames and 21 frames, respectively, to resident memory before needing to download to a computer or record to memory disk. Because of the very fast shutter speeds of these cameras there is unlikely to be any blurring on an individual image. Therefore, software processing may be used to realign any movement shifts that may exist between images.

Upon acquiring the appropriate images, the images are downloaded to the data processing unit 34 shown near the chute area in FIG. 1. The data processing unit in turn passes the data to the personal computer for display and storage of the data. While the data processing unit 34 and the personal computer 32 are shown alongside the chute, these components may be located a significant distance from the chute area provided that transmission speed and accuracy are not compromised.

The data obtained from camera 124 must be processed to obtain the range images and then undergo further processing to form a 3D model of the target animal illustrated in FIGS. 28, 29, 30 and 31. Once in the form of a 3D model, the data can be interrogated in a manner presently described to obtain useful measurements such as hip height and hip width.

In the data processing progression of this latest form of the method of the invention, the range camera first acquires digital images of the target animal. Next, the digital images are processed by a range image algorithm to obtain a three-dimensional point cloud set. The next processing step involves Delaunay triangulation in a manner well understood by those skilled in the art. This step produces a set of lines connecting each point in the 3D set to its natural neighbors. The result of Delaunay triangulation is a triangular mesh surface with non-uniform sampling in any specific coordinate system. A rectangular grid is next generated with dimensions similar to those of the triangular mesh. Using the triangular mesh data interpolation techniques is used to match the triangular data set to the rectangular grid samples. The output of this process is a 3D surface with points located on a rectangular grid. This data can be displayed in the manner shown in FIGS. 28, 29, 30 and 31 and interrogated via a laptop or desktop computer which in turn may communicate with selected peripheral devices.

Figure 28:
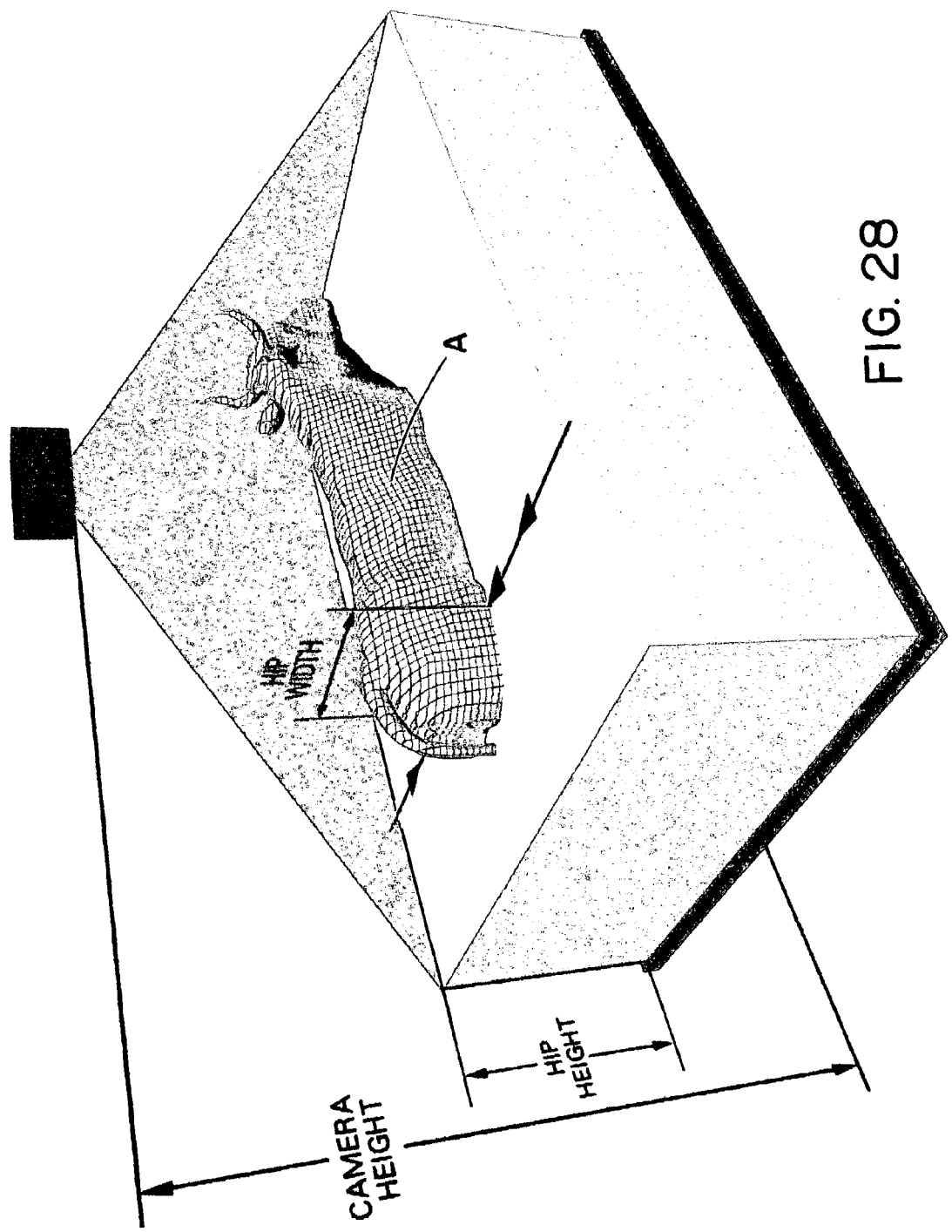
FIG. 28 is a generally perspective, illustrative view of yet another form of the apparatus of the invention using a range camera to obtain an image of a portion of the target animal.

It is to be understood that, while the range camera 224 provides orthogonal dimensions, it is also capable of axial linear measurements. As indicated in FIG. 28, the dimension orthogonal to the camera axis, namely, the hip width may be measured by identifying the sides of the target animal and computing their separation across the range image in a manner somewhat similar to a common digital camera. The dimension aligned parallel with the camera axis, namely, hip height, may be calculated from height data knowing the camera height above the ground (for the over head camera condition).

FIGS. 29 and 30 illustrate the information via a top and a side view of the 3D data. By knowing the height of the range camera from the ground (top view camera position) the height of any point on the surface can be easily computed by simple subtraction of the range distance (surface to camera) from the camera height. With this technique, the hip height is easily found as indicated in FIG. 29. The hip width may be found as shown in FIG. 30 by identifying the two sides of the hip and subtracting their positions.

By way of brief summary, it is to be appreciated that in the practice of the present invention, numerous camera positions are possible to obtain the desired measurements. In the course of this discussion many of the concepts have been described with the camera located overhead. While this is an advantageous position, the scope of this patent should not be limited by this description when the methods described herein apply to other rotations, translations and views.

The top view encompasses a number of practical advantages for this particular application. By locating the camera above the target animal, it is out of the way and less likely to get damaged. The top view also provides the orthogonal measurement aligned with hip width. For transverse lighting methods, the light sources, reflectors, and screens may be located on the sides of the target animal.

The side view is another option for camera location. Only one side of this view, the top of the target animal, is available for light sources, mirrors, or screens. Even with this restriction, a common sense evaluation of the previously mentioned methods provides a number of methods, which work in this configuration.

Figure 31:
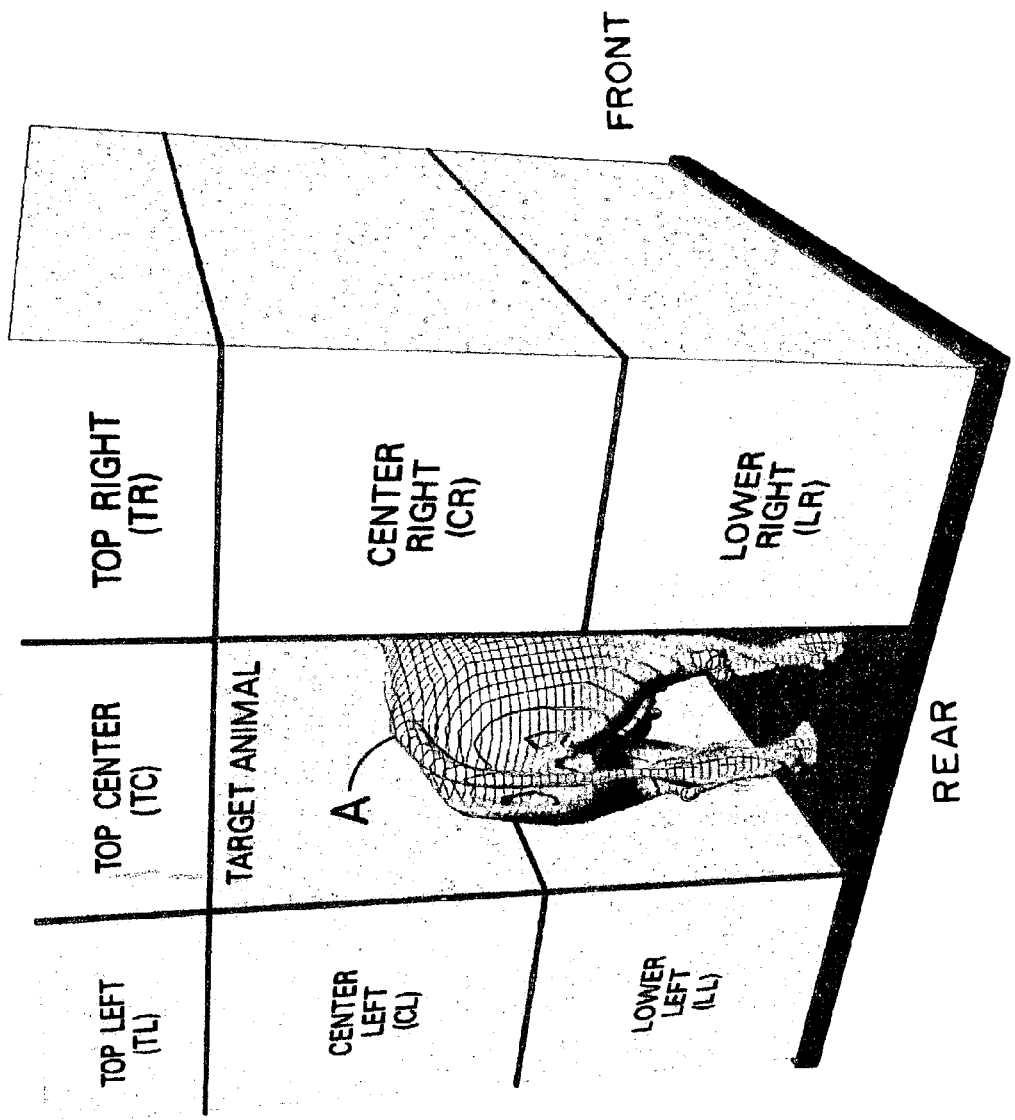
FIG. 31 is a generally perspective, diagrammatic view illustrating the regions of the apparatus surrounding the target animal.
Figure 32:
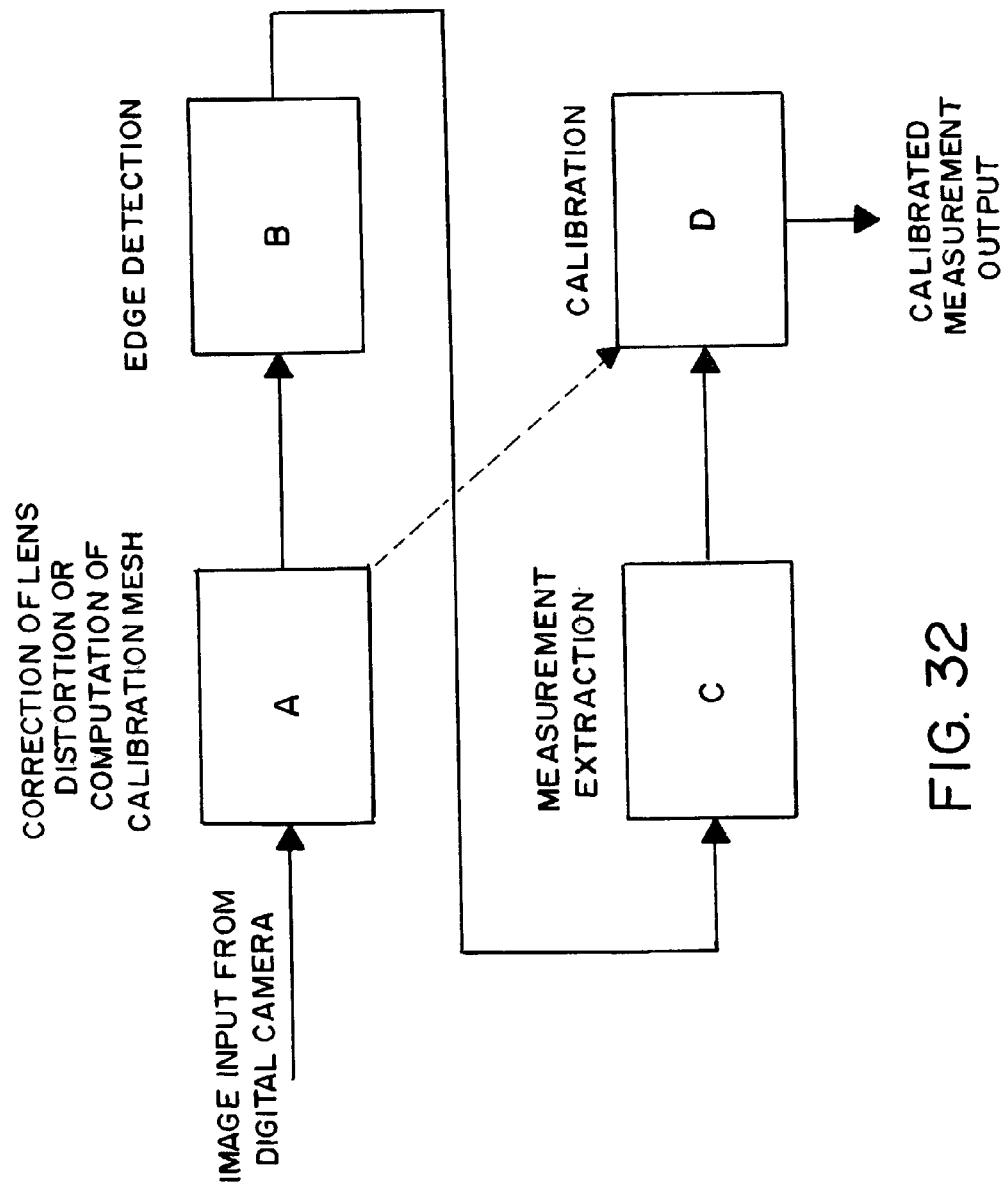
FIG. 32 is a generally diagrammatic view illustrating one form of the method of the invention for correction of lens distortion.

Camera views which are not in the midsagittal plane (the plane running head to tail which divides the animal into right and left halves) or orthogonal to it have significant disadvantages in this application. Such an oblique view is illustrated in FIG. 31.

Numerous optical calculations exist to calibrate the dimensions of the systems described herein. However, the use of a calibrated, physical template provides a simple and direct calibration technique. By placing a 3D block or shape of known dimensions in the place of the target animal, the processor can determine the proper calibration by scaling the measured distance in pixels to the proper physical measurements know to be possessed by the calibration shape.

Correction for Lens Distortion

Figure 33:
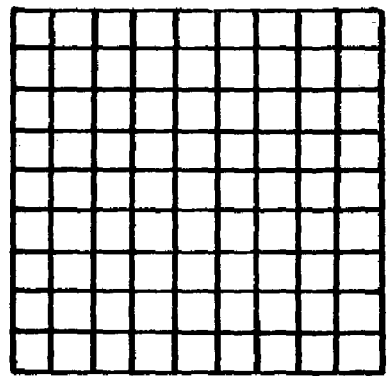
FIG. 33 is a generally diagrammatic view illustrating a rectangular calibration grid used in one form of the method of the invention for correcting lens distortion.
Figure 34:
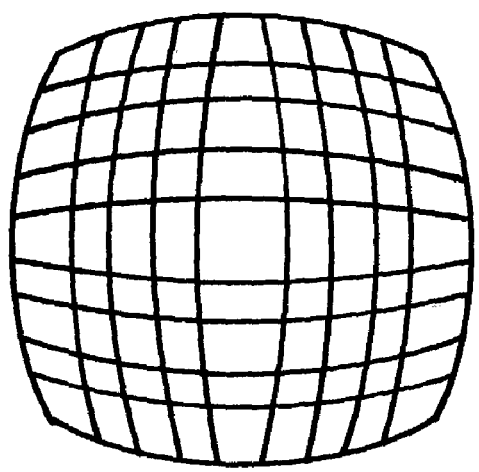
FIG. 34 is a generally diagrammatic view illustrating barrel distortion common with wide-angle lenses.
Figure 35:
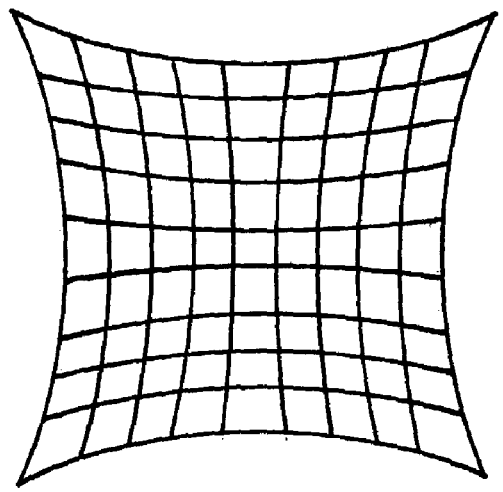
FIG. 35 is a generally diagrammatic view illustrating pin cushion distortion common with telephoto lenses.

Any range camera technology employing visible-spectrum cameras relies heavily upon the integrity of the 2D image in order to extract 3D information by selected range camera principles. The 3D features present in the 2D image may be significantly altered by lens distortion within the 2D camera system. For this reason is necessary to correct the 2D image for lens distortion. This correction occurs after the 2D image has been digitized and before attempting to extract 3D information from the image. FIG. 33 illustrates a rectangular grid similar in concept to one that might be used to calibrate the present invention (many more lines would be on the actual grid used for calibration). Since the target animal is large and the desired lens-to-target, working distance is typically under 12 feet, a wide angle lens is a logical selection. Images taken with such a wide-angle lens system will result in a barrel distortion effect of the character illustrated in FIG. 34. Conversely, if a longer, telephoto lens is used, (requiring a much longer working distance) a pincushion distortion of the character shown in FIG. 35 results. In the case of barrel distortion, the region of the image near the center is enlarged and the region around the edges is smaller (FIG. 34). In the case of pincushion distortion, the portion of the image near the center is typically smaller and the region around the edges is larger (FIG. 35). Most cameras use multi-lens optical systems, which inherently contain some elements of distortion, not unlike that described above. Such lens systems that would be applicable to these single camera imaging systems include wide angle, mid-range, telephoto, telecentric, and parabolic on and off axis optics.

Correction of the camera distortion, as well as other distortions that may occur, may be accomplished via commercially available software packages if the processing interface is acceptable. Commercially available software packages are available to correct the image for such distortion. Such a package as LensDoc™ from Andromeda Software (699 Hampshire Rd., Ste. 109, Thousand Oaks, Calif., 91361) provides such processing for photo software packages such as Adobe Photoshop and Paint Shop Pro.

Figure 36:
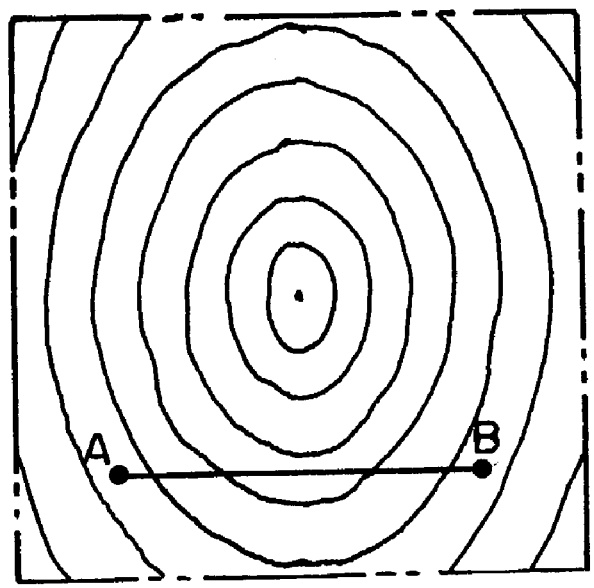
FIG. 36 is a generally diagrammatic view comprising a contour representation of the image shown in FIG. 34.
Figure 37:
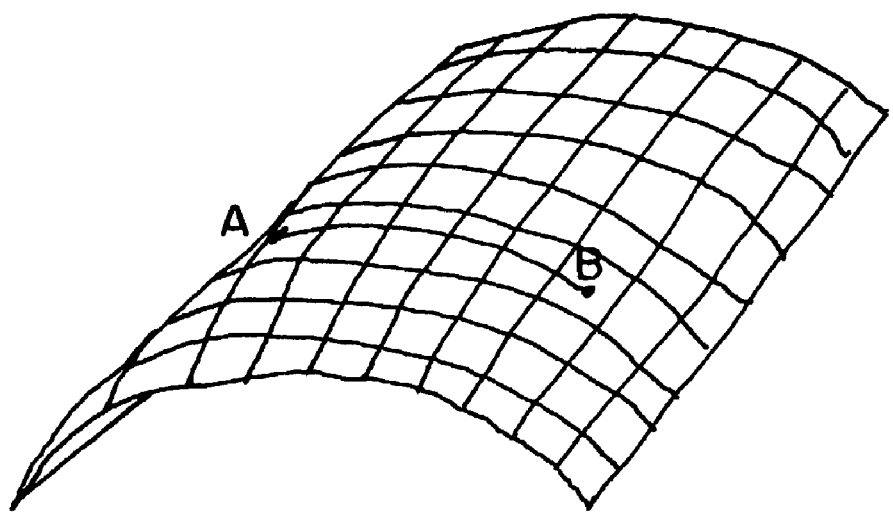
FIG. 37 is a generally diagrammatic view of the surface depicted in FIG. 36, but shown in a mesh surface plot format.
Figure 38:
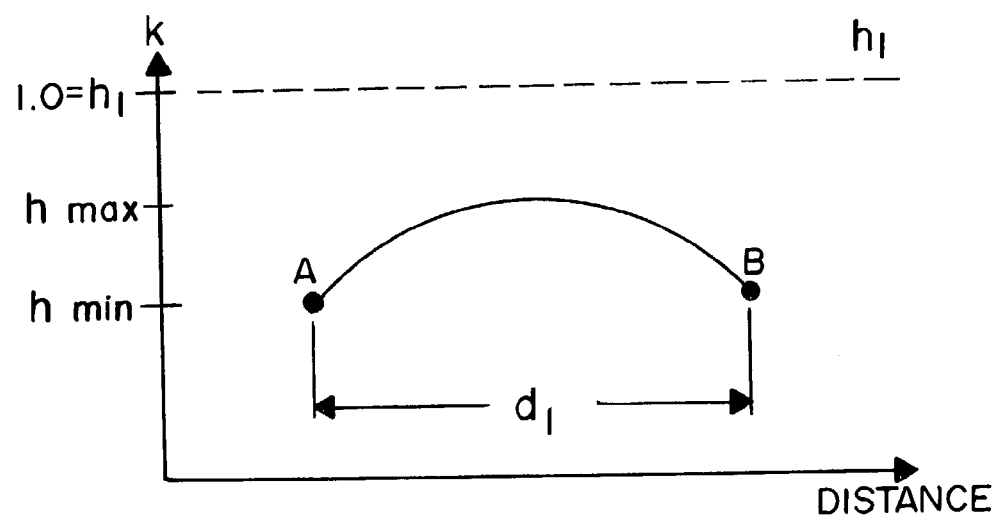
FIG. 38 is a generally diagrammatic view illustrating surface values from point A to point B of the surface plot shown in FIG. 37.
Figure 39:
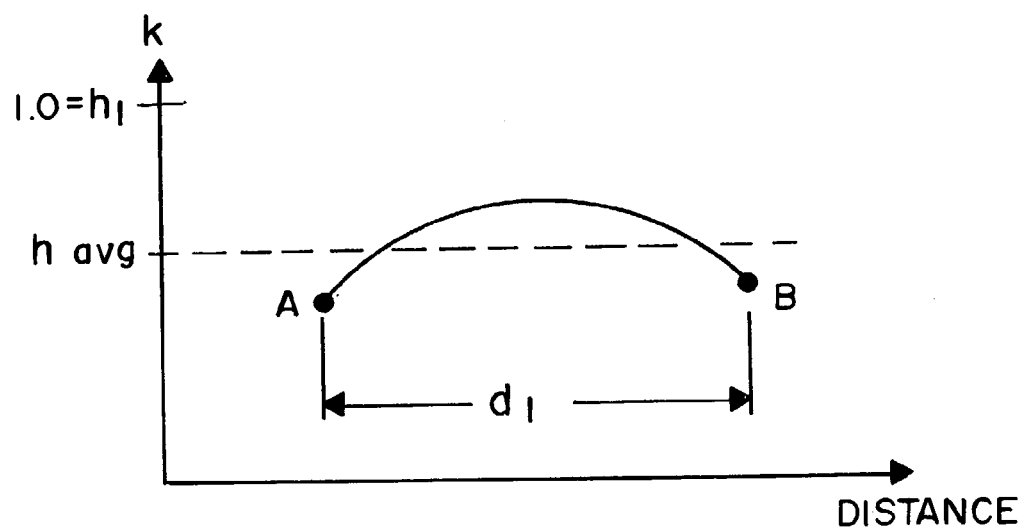
FIG. 39 is a generally diagrammatic view illustrating average surface values from point A to point B of the surface plot shown in FIG. 37.

Custom correction of the distortion can also be accomplished through a knowledge of the distortion magnitude. For example, if the size of each square in the barrel distortion shown in FIG. 34 is measured and the values (cross sectional distance or square root of each area) are plotted across the image on the center of each square, a surface will be formed across the image that has greater magnitude in the image center and lesser magnitude at the edges of the image. A contour plot of the resulting surface is shown in FIG. 36. FIG. 37 shows the same surface in a mesh surface plot format. In FIG. 38 the surface values from point A to point B are shown with the associated values being less than the nominal value in the middle of the image, $h_l$ as shown in the figure drawings.

By computing the average surface value over the distance A-B, a compensation factor for the distance may be computed. Since A-B of the image is shorter than the true A-B due to the shrinking of peripheral regions in a wide-angle lens, multiplication of the measured A-B distance by $h_l/h_{avg}$ will result in the proper enlargement of the measured A-B distance to take into account the lens distortion. The distance correction for the lens distortion is:

$$k = h_l/h_{avg}; \text{ and} \tag{2-3}$$

$$d_{corrected} = k \cdot d_{measured} \tag{2-4}$$

This calibration factor, k, may be passed to the calibration block within the processing channel.

The basic process for correcting the barrel distortion described above may be applied for the pincushion distortion illustrated in FIG. 35 or to other distortions which may be encountered. While optics with no or minimal distortion are always preferred, some level of distortion may be removed in the above manner.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for determining selected physical characteristics of a target animal comprising:
   (a) structural means for defining a target area for positioning the target animal, said target area having a generally centrally disposed, substantially vertical, longitudinally extending first plane;
   (b) at least one light source supported by said structural means for illuminating at least a portion of the target animal;
   (c) a single camera supported by said structural means at a spaced apart location from said at least one light source and from the target animal for obtaining imaging data of the target animal including a continuous, uninterrupted visual image of the configuration of a substantial portion of the target animal; and
   (d) data processing means operably associated with said single camera for processing said imaging data.

2. The apparatus as defined in claim 1 in which said light source is disposed in substantial alignment with said first plane and in which said single camera has an axial centerline disposed in substantial alignment with said first plane.

3. The apparatus as defined in claim 1 in which said first plane has first and second sides and in which said light source is disposed on said first side of said first plane and in which said single camera is disposed on said first side of said first plane.

4. The apparatus as defined in claim 1 in which said single camera comprises a range camera.

5. The apparatus as defined in claim 1 in which said single camera comprises a thermal imaging camera.

6. The apparatus as defined in claim 1 in which said light source comprises a laser light source.

7. The apparatus as defined in claim 1 in which said light source comprises a structured light source.

8. The apparatus as defined in claim 1 in which said light source comprises a fluorescent light.

9. The apparatus as defined in claim 1 in which said light source comprises a plurality of illuminators aligned with said first plane.

10. The apparatus as defined in claim 1 further including a reflector mounted on said structural means for reflecting light from said light source in a direction toward the target animal.

11. The apparatus as defined in claim 1 in which said light source comprises an infrared light source and in which said apparatus further includes an infrared reflector mounted on said structural means for reflecting infrared light in a direction toward said camera.

12. The apparatus as defined in claim 1 in which said target area includes a floor and in which said apparatus further includes weighing means carried by said floor for measuring the weight of the target animal.

13. The apparatus as defined in claim 1 in which said structural means comprises a chute for guiding the target animal into the target area.

14. An apparatus for determining the hip height and the hip width of a target animal comprising:
(a) structural means for defining a target area for positioning the target animal, said target area having a generally centrally disposed, substantially vertical, longitudinally extending first plane having first and second sides, said structural means comprising a chute for guiding the target animal into the target area;
(b) a plurality of light sources supported by said structural means for illuminating at least a portion of the target animal;
(c) a single camera supported by said structural means at a spaced apart location from said plurality of light sources and from the target animal for obtaining imaging data of the target animal comprising a continuous unbroken image of the configuration of a substantial portion of the target animal; and
(d) data processing means operably associated with said single camera for processing said imaging data to determine the hip height and the hip width of the target animal.

15. The apparatus as defined in claim 14 in which said plurality of spaced apart light sources are disposed in substantial alignment with said first plane and in which said single camera has an axial centerline disposed in a second plane that is substantially aligned with said first plane.

16. The apparatus as defined in claim 14 in which said light sources are disposed on said first side of said first plane and in which said single camera is disposed on said first side of said first plane.

17. The apparatus as defined in claim 14 in which said single camera comprises a range camera.

18. The apparatus as defined in claim 14 in which said single camera comprises a thermal imaging camera.

19. The apparatus as defined in claim 14 in which said light source comprises a laser light source.

20. The apparatus as defined in claim 14 in which said light source comprises a structured light source.

21. The apparatus as defined in claim 14 in which said light source comprises a fluorescent light.

22. The apparatus as defined in claim 21 further including a reflector mounted located on said first side of said plane adjacent said target area for reflecting light from said fluorescent light in a direction toward the target animal.

23. The apparatus as defined in claim 22 further including an angularly extending white reflector surface located on said second side of said plane adjacent said target area.

24. A method for determining the hip height and the hip width of a target animal having a midsagittal plane using a single camera mounted on structural means for defining a target area for positioning the target animal, said target area having a generally centrally disposed, substantially vertical, longitudinally extending first plane; a plurality of spaced apart light sources supported by said structural means for illuminating at least a portion of the target animal; and data processing means operably associated with said single camera for processing said imaging data, said method comprising the steps of:
(a) positioning the target animal within the target area so that the midsagittal plane of the target animal is aligned with said first plane;
(b) using the light sources illuminating at least a portion of the target animal;
(c) using the single camera obtaining a continuous, uninterrupted image of a substantial portion of the target animal; and
(d) using the data processing means analyzing said a image to determine the hip height and the hip width of the target animal.

25. The method as defined in claim 24 including the further step of positioning the light sources in substantial alignment with the first plane of the target area.

26. The method as defined in claim 25 including the further step of positioning the single camera in substantially alignment with said first plane of the target area.

27. The method as defined in claim 24 in which the first plane of the target area has first and second sides and in which the method includes the further step of positioning the light sources on the first side of the first plane.

28. The method as defined in claim 27 including the further step of positioning the single camera on the first side of the first plane.

29. The method as defined in claim 24 in which the light sources of the apparatus comprise structured light sources for projecting a pattern on the target animal and in which the method includes the further steps of:
(a) positioning the structured light sources in substantial alignment with the first plane of the target area;
(b) using the camera obtaining an image of the pattern on the target animal; and
(c) using the data processing means analyzing said pattern to determine the hip height and the hip width of the target animal.

* * * * *